United States Patent
Azami et al.

(10) Patent No.: US 9,364,752 B2
(45) Date of Patent: Jun. 14, 2016

(54) MOBILE DEVICE, AND METHOD AND COMPUTER READABLE STORAGE MEDIUM THEREFOR

(75) Inventors: Toshihiro Azami, Kawasaki (JP); Makoto Uchishima, Kawasaki (JP); Arata Jogo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 661 days.

(21) Appl. No.: 13/399,349

(22) Filed: Feb. 17, 2012

(65) Prior Publication Data

US 2012/0149395 A1 Jun. 14, 2012

Related U.S. Application Data

(63) Continuation of application No. PCT/JP2009/064511, filed on Aug. 19, 2009.

(51) Int. Cl.
*H04W 24/00* (2009.01)
*A63F 13/30* (2014.01)

(52) U.S. Cl.
CPC .......... *A63F 13/12* (2013.01); *A63F 2300/204* (2013.01); *A63F 2300/5573* (2013.01)

(58) Field of Classification Search
CPC .............. A63F 13/12; A63F 2300/204; A63F 2300/5573
USPC .......... 455/456.1, 456.2, 456.3, 456.4, 456.5, 455/456.6, 457
See application file for complete search history.

(56) References Cited

U.S. PATENT DOCUMENTS

| | | | | |
|---|---|---|---|---|
| 6,756,882 | B2 * | 6/2004 | Benes et al. | 340/323 R |
| 7,366,522 | B2 * | 4/2008 | Thomas | 455/456.1 |
| 8,050,690 | B2 * | 11/2011 | Neeraj | 455/456.1 |
| 8,428,614 | B2 * | 4/2013 | Wolfe | 455/456.1 |
| 8,504,617 | B2 * | 8/2013 | Amaitis et al. | 709/205 |
| 2002/0111139 | A1 | 8/2002 | Nishiyama et al. | |
| 2003/0191578 | A1 * | 10/2003 | Paulauskas | G01C 21/3682 701/438 |
| 2004/0046655 | A1 | 3/2004 | Benes et al. | |
| 2006/0212218 | A1 * | 9/2006 | Smith | G01C 21/30 701/426 |

(Continued)

FOREIGN PATENT DOCUMENTS

| | | |
|---|---|---|
| JP | 2000-126464 | 5/2000 |
| JP | 2002-49681 | 2/2002 |

(Continued)

OTHER PUBLICATIONS

Japanese Office Action issued May 21, 2013 in corresponding Japanese Patent Application No. 2011-527518.

(Continued)

*Primary Examiner* — Keith Fang

(74) *Attorney, Agent, or Firm* — Staas & Halsey LLP

(57) ABSTRACT

A mobile device includes: a location detecting unit configured to detect a location of the mobile device; an operation instructing unit configured to instruct a user to perform a specific operation when the location detecting unit detects a specific location; an operation detecting unit configured to detect the specific operation of the user; a determining unit configured to determine whether the specific operation has been performed at the specific location; and a status changing unit configured to change a status of the mobile device when the determining unit determines that the specific operation has been performed at the specific location.

9 Claims, 23 Drawing Sheets

(56) References Cited

U.S. PATENT DOCUMENTS

| | | | | |
|---|---|---|---|---|
| 2006/0229802 A1* | 10/2006 | Vertelney | G01C 21/3617 | 701/532 |
| 2009/0036186 A1* | 2/2009 | Benco et al. | | 463/9 |
| 2009/0270743 A1* | 10/2009 | Dugan | A61B 5/0002 | 600/500 |
| 2009/0287411 A1* | 11/2009 | Sweeney | H04L 67/24 | 701/469 |
| 2010/0009696 A1* | 1/2010 | Fok | H04W 64/00 | 455/456.1 |
| 2010/0030624 A1* | 2/2010 | Vanska | G01C 21/20 | 705/14.64 |
| 2010/0160013 A1* | 6/2010 | Sanders | G01S 5/0027 | 463/6 |
| 2012/0214517 A1* | 8/2012 | Singh | G06Q 10/109 | 455/456.3 |

FOREIGN PATENT DOCUMENTS

| | | |
|---|---|---|
| JP | 2002-245077 | 8/2002 |
| JP | 2004-334649 | 11/2004 |
| JP | 2005-210663 | 8/2005 |
| JP | 2005-537863 | 12/2005 |
| JP | 2006-209214 | 8/2006 |
| JP | 2008-73265 | 4/2008 |
| JP | 2009-125077 | 6/2009 |

OTHER PUBLICATIONS

International Search Report (PCT/ISA/210) for PCT/JP2009/064511, mailed Sep. 15, 2009.

* cited by examiner

MOBILE DEVICE, AND METHOD AND COMPUTER READABLE STORAGE MEDIUM THEREFOR

CROSS-REFERENCE TO RELATED APPLICATION

This application is a continuation application of PCT/JP2009/064511 filed Aug. 19, 2009, the entire contents of which are hereby wholly incorporated by reference.

FIELD

A certain aspect of the embodiments described herein is related to a mobile device, and a method and computer readable storage medium therefor.

BACKGROUND

Systems such as GPS (Global Positioning System) that can obtain location information have been widely used among mobile devices such as mobile telephones. Services that provide games and the like using location information obtained by mobile devices have been known.

For example, a mobile telephone terminal displays a map, using obtained location information. Following the map, users move to actual event spots, and do a quiz or play a game. In a known service, a point is earned when a user guesses right on a quiz or wins a game (see Patent Document 1, for example).

Also, a mobile device obtains local information that is provided in accordance with acquired location information. In a known service, a mobile device outputs local information only when a user performs a predetermined input operation in a game program (see Patent Document 2, for example).

Patent Document 1: Japanese Laid-Open Patent Publication No. 2002-49681

Patent Document 2: Japanese Laid-Open Patent Publication No. 2004-334649

In the services disclosed in Patent Documents 1 and 2, however, a check is not made to determine whether a user has played a game or the like at a specific location. Therefore, each participant in the game cannot increase excitement for the game. Therefore, there is a demand for varied and attractive services using location information.

SUMMARY

According to an aspect of an embodiment, there is provided a mobile device including: a location detecting unit configured to detect a location of the mobile device; an operation instructing unit configured to instruct a user to perform a specific operation when the location detecting unit detects a specific location; an operation detecting unit configured to detect the specific operation of the user; a determining unit configured to determine whether the specific operation has been performed at the specific location; and a status changing unit configured to change a status of the mobile device when the determining unit determines that the specific operation has been performed at the specific location.

DESCRIPTION OF EMBODIMENTS

The following is a description of embodiments of methods and computer readable storage media through examples of mobile telephone terminals, with reference to the accompanying drawings.

Embodiment 1

Figure 1:
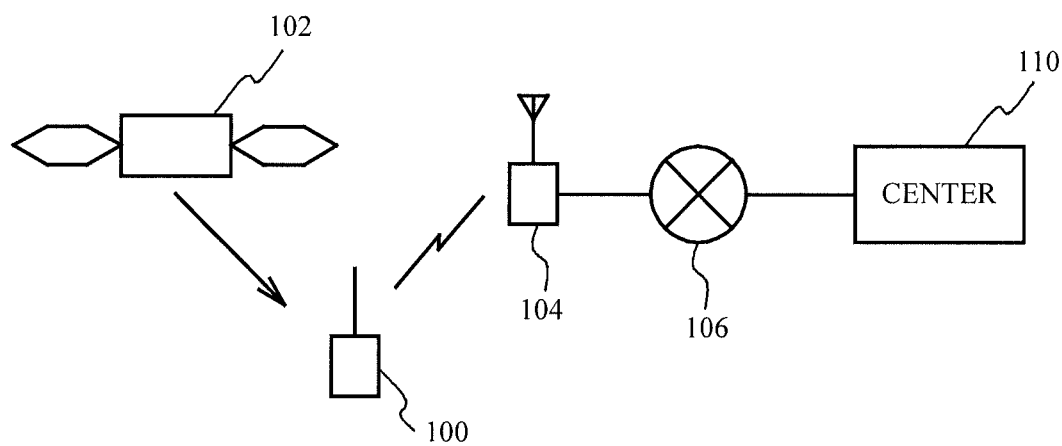
FIG. 1 is a diagram showing a system in which a mobile device according to an embodiment is used.

Embodiment 1 is an example of a game in which a user can have points added or obtain items by performing a specific operation at a specific location. FIG. 1 is a diagram illustrating a system in which a mobile device according to this embodiment is used. As shown in FIG. 1, the system includes a mobile device 100, a GPS satellite 102, a base station 104, a network 106, and a remote center 110. The mobile device 100 receives electric waves from the GPS satellite 102, and can recognize its own location. The mobile device 100 and the base station 104 can perform wireless communications. The base station 104 is connected to the center 110 via the network 106. The mobile device 100 is a mobile telephone terminal, for example, and the center 110 is a server, for example. The mobile device 100 and the center can perform data transmission and reception via the base station 104 and the network 106.

Figure 2:
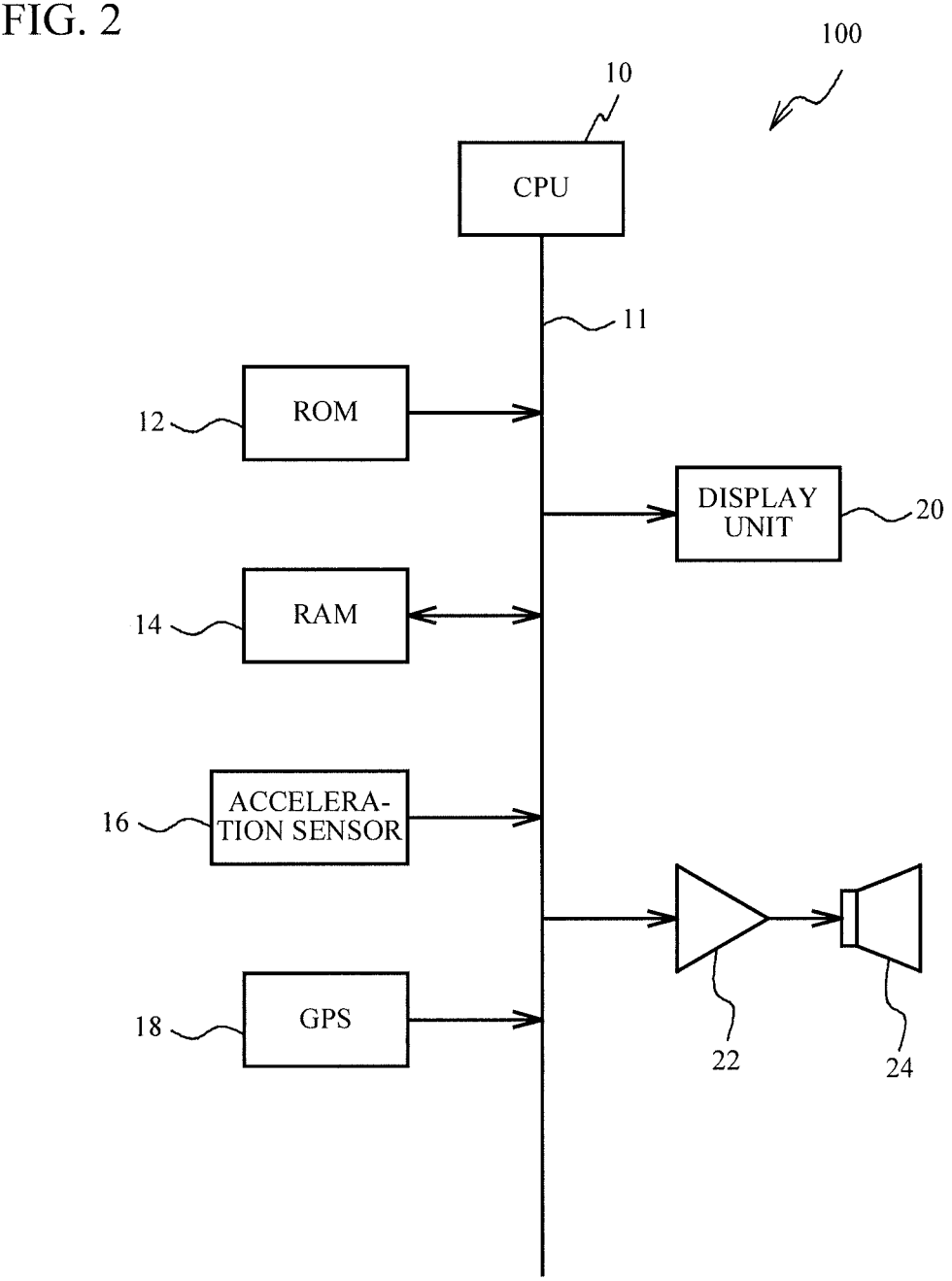
FIG. 2 is a block diagram of a mobile device according to Embodiment 1.

FIG. 2 is a block diagram of the mobile device according to Embodiment 1. The mobile device 100 includes a CPU (Central Processing Unit) 10, a ROM (Read Only Memory) 12, a RAM (Random Access Memory) 14, an acceleration sensor 16, a GPS receiving unit 18, a display unit 20, an amplifier 22, a speaker 24, and a bus 11 connecting those components. The ROM 12 stores programs, map data, and the like. The RAM 14 temporarily stores various kinds of information. The RAM 14 also serves as a nonvolatile memory. The acceleration sensor 16 detects an acceleration applied to the mobile device 100. For example, when the user jumps or walks or the like while carrying the mobile device 100, the acceleration sensor 16 detects the acceleration applied to the mobile device 100 at this point. The display unit 20 is a liquid crystal panel or an organic EL (Electroluminescence) panel, for example. The amplifier 22 amplifies audio signals. The speaker 24 outputs the amplified audio signals as sound. The CPU 10 controls those functions.

Figure 3:
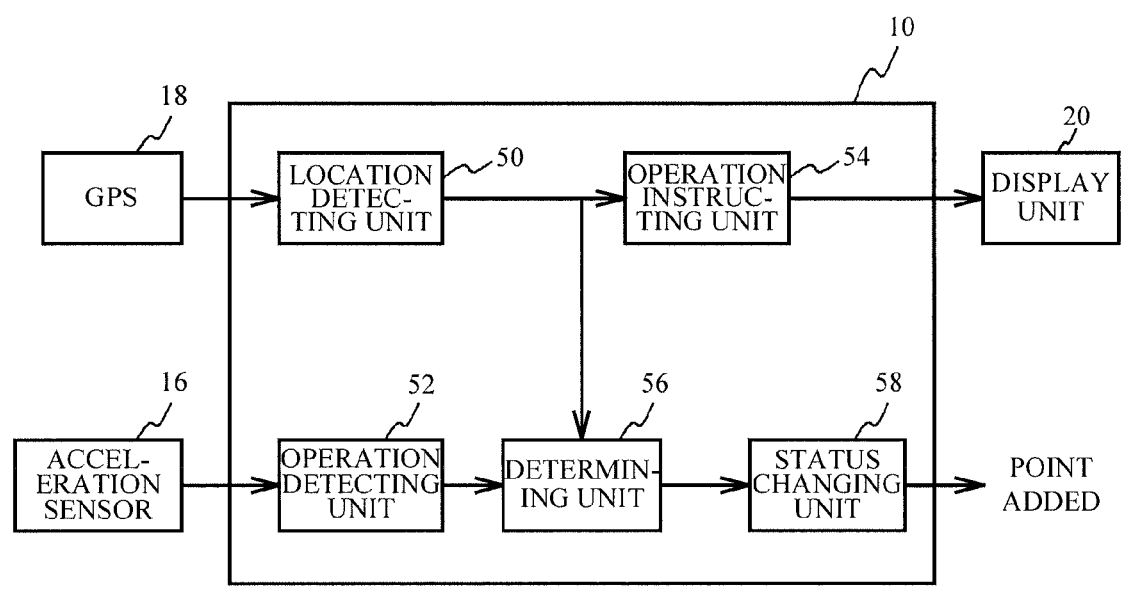
FIG. 3 is a functional block diagram of the mobile device according to Embodiment 1.

FIG. 3 is a functional block diagram of the mobile device according to Embodiment 1. The CPU 10 or a computer executes programs, so as to function as a location detecting unit 50, an operation detecting unit 52, an operation instructing unit 54, a determining unit 56, and a status changing unit 58. The location detecting unit 50 detects the current location of the mobile device 100, from a GPS signal received by the GPS receiving unit 18. In a case where the location detecting unit 50 detects a specific location, the operation instructing unit 54 instructs the user to perform a specific operation, using the display unit 20 or the speaker. The operation detecting unit 52 receives a signal from the acceleration sensor 16, and determines whether the user has performed the specific operation. The determining unit 56 determines whether the specific operation by the user has been performed at a specific location. When the determining unit 56 determines that the specific operation by the user has been performed at the specific location, the status changing unit 58 changes the status of the mobile device. For example, the determining unit 56 adds a point, or obtains an item relevant to the game.

Figure 4:
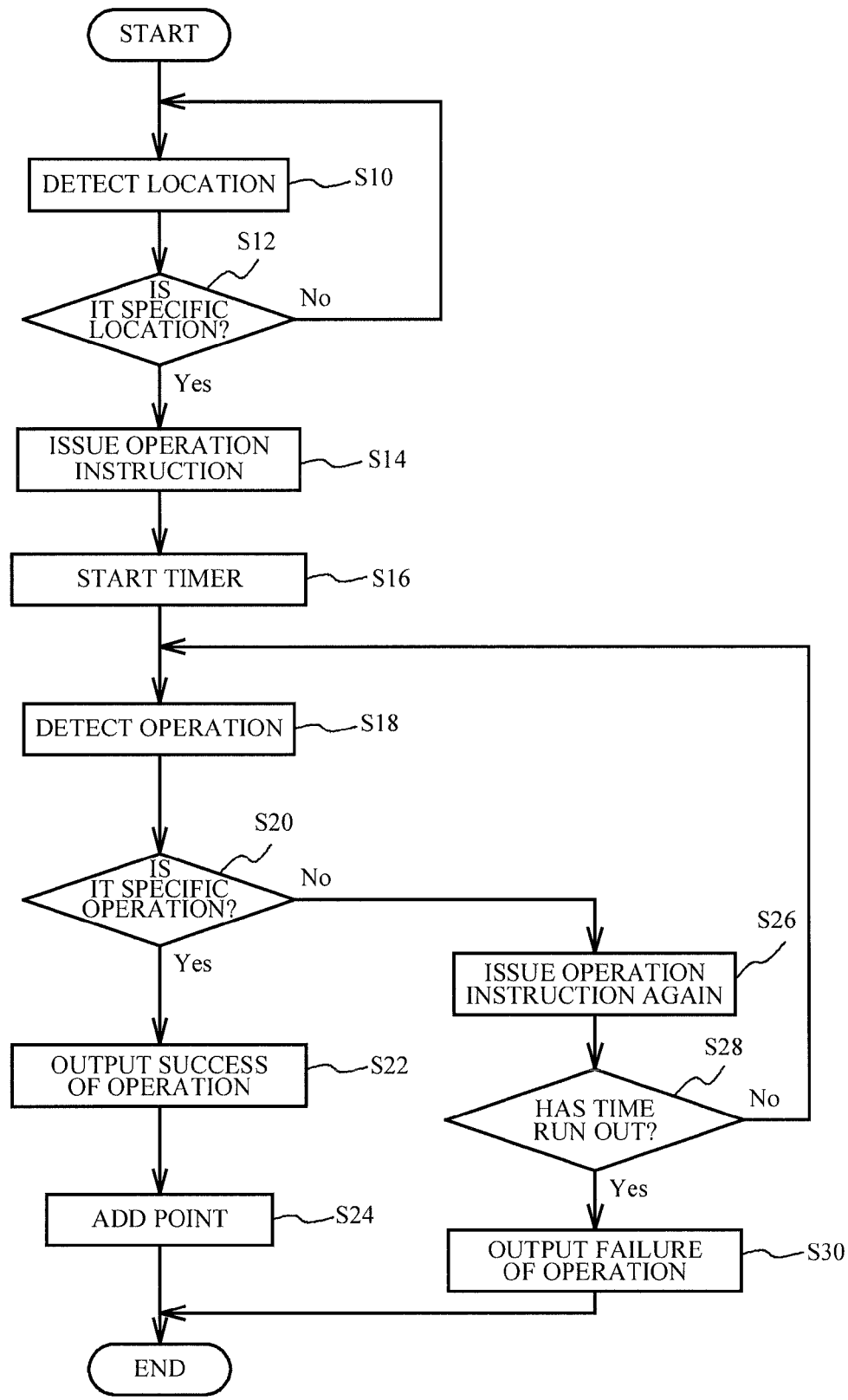
FIG. 4 is a flowchart showing an operation to be performed by the mobile device according to Embodiment 1.
Figure 5A:
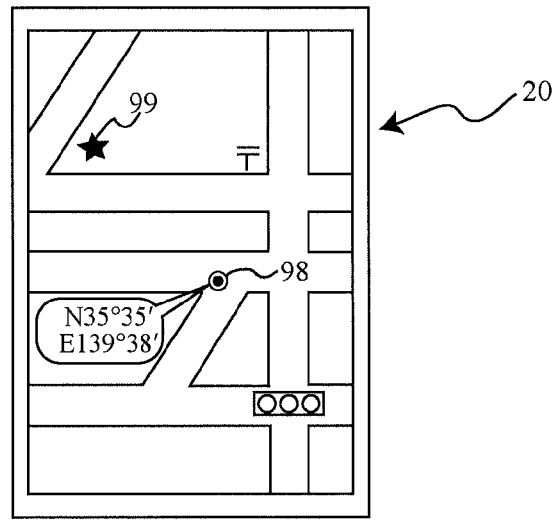
FIGS. 5A through 5C are diagrams each showing the display screen of the display unit.
Figure 5B:
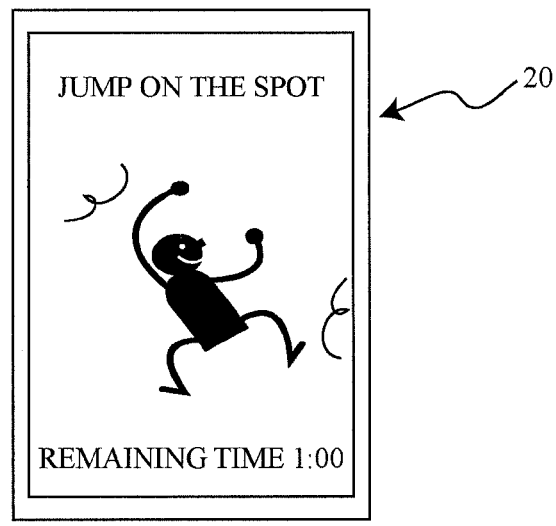
Figure 5C:
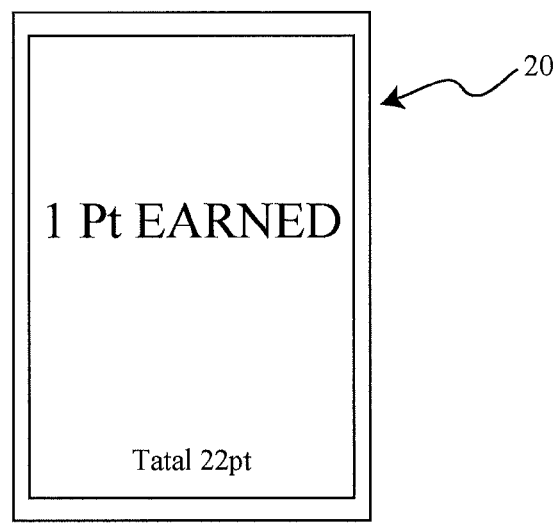

FIG. 4 is a flowchart showing an operation to be performed by the mobile device according to Embodiment 1. FIGS. 5A through 5C are diagrams showing display screens of the display unit 20. The location detecting unit 50 detects the current location of the mobile device 100, from a GPS signal received by the GPS receiving unit 18 (step S10). For example, the display unit 20 displays a current location 98 and a specific location 99 of the mobile device 100 on a map, as shown in FIG. 5A. The specific location 99 or specific locations 99 may be set beforehand, and be stored into the RAM 14 or the like. The latitude and longitude may be displayed with the current location 98. The location detecting unit 50 determines whether the detected location is a specific location (step S12). If the detected location is within a range including the specific location, the location detecting unit 50 can determine that the detected location is the specific location. If the result indicates "No," the operation returns to step S10. If the result indicates "Yes," the operation instructing unit 54 issues an instruction to prompt the user to perform a specific operation (step S14). For example, the operation instructing unit 54 displays an instruction on the display unit 20 to instruct the user to jump on the spot, as shown in FIG. 5B. It should be noted that the operation instructing unit 54 may issue an instruction to the user with sound, using the speaker 24.

The determining unit 56 starts a timer (step S16). The timer may be set beforehand at 1 minute, for example. As shown in FIG. 5B, the display unit 20 may display the remaining time of the timer. The operation detecting unit 52 detects an operation by the user, from an output from the acceleration sensor 16 (step S18). The operation detecting unit 52 determines whether the user operation is a specific operation (step S20). For example, in a case where an output signal from the output signal from the acceleration sensor 16 is the same as or similar to a predetermined signal pattern of the acceleration sensor 16, the operation detecting unit 52 determines that the user operation is a specific operation. The signal pattern of the acceleration sensor 16 is stored in the RAM 14, for example. If the result indicates "No," the operation instructing unit 54 again issues an instruction about an operation to the user (step S26). The determining unit 56 determines whether the predetermined time that has been set on the timer has come or whether the time has run out (step S28). If the result indicates "No," the operation returns to step S18. If the result indicates "Yes," the determining unit 56 outputs the failure of the operation to the display unit 20 or the speaker 24 (step S30). The operation then comes to an end.

If the result of step S20 indicates "Yes," the determining unit 56 outputs the success of the operation to the display unit 20 or the speaker 24 (step S22). The status changing unit 58 changes the status of the mobile device 100. For example, a point is added. Points are stored in the RAM 14, for example, and a point can be added every time the user performs a specific operation at a specific location. As shown in FIG. 5C, the earning of a point can be displayed on the display unit 20. Also, the total number of accumulated points may be displayed. Other than a point, the status changing unit 58 can obtain an item to be used in the game. The operation then comes to an end.

According to Embodiment 1, as in step S28 of FIG. 4, the determining unit 56 determines whether a specific operation by the user has been performed within a predetermined period of time. If a specific operation is performed within a certain period of time since the operation instructing unit 54 instructs the user to perform a specific operation, it is considered that the specific operation has been performed at the specific location detected by the location detecting unit 50 in step S12. In a case where the determining unit 56 determines whether a specific operation by the user has been performed at a specific location, and determines that a specific operation has been performed at a specific location in the above manner, the status changing unit 58 changes the status of the mobile device 100 as in step S24. In this manner, the user can earn a point or the like by performing a specific operation at an actual location. Accordingly, each participant in the game can feel more excitement for the game. Thus, varied and attractive services can be provided.

As described above, based on the time between an instruction about a specific operation from the operation instructing unit 54 to the user and detection of a specific operation by the operation detecting unit 52, the determining unit 56 determines whether a specific operation has been performed at a specific location. In this manner, the determining unit 56 can more readily determine whether a specific operation has been performed at a specific location than in a case where a reader or a writer for QR (Quick Response) codes or noncontact IC cards is set at a specific location so as to determine the specific location. Thus, each user can feel more excitement for the game.

Embodiment 2

Embodiment 2 is an example in which the location detection is again performed after a specific operation by the user is detected. Embodiment 2 can be illustrated in the same block diagram and functional block diagram as those of FIGS. 2 and 3, respectively, and explanation thereof is omitted herein.

Figure 6:
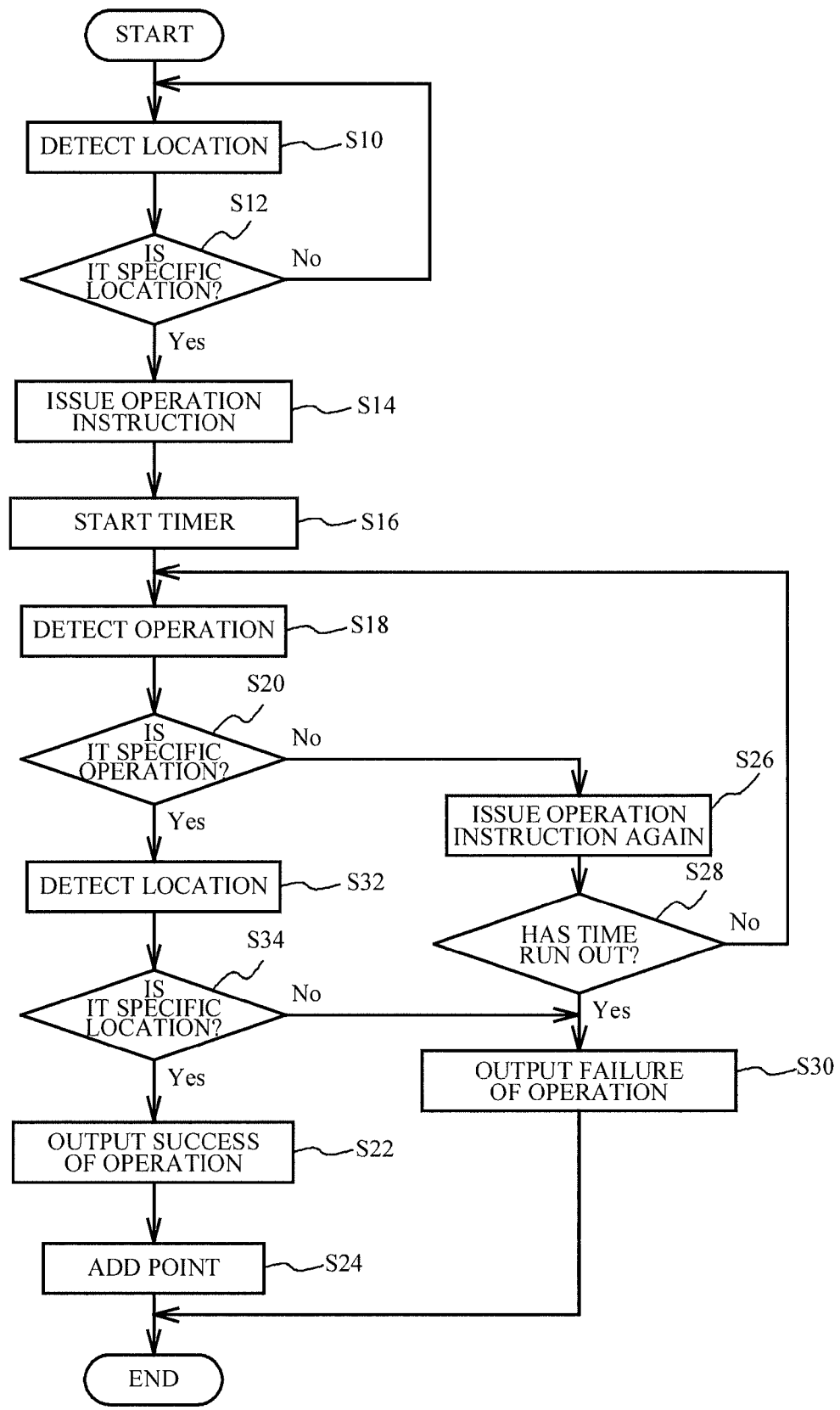
FIG. 6 is a flowchart showing an operation to be performed by a mobile device according to Embodiment 2.

FIG. 6 is a flowchart showing an operation to be performed by a mobile device according to Embodiment 2. After the result of step S20 indicates "Yes," the location detecting unit 50 again detects the current location of the mobile device 100 (step S32). The determining unit 56 determines whether the location detected by the location detecting unit 50 is the specific location (step S34). If the result indicates "No," the operation moves on to step S30. If the results indicates "Yes," the operation moves on to step S22. The other steps are the same as those of Embodiment 1 shown in FIG. 4, and explanation of them is omitted herein.

According to Embodiment 2, in a case where the operation detecting unit 52 detects a specific operation by the user, the location detecting unit 50 again detects the location of the mobile device 100 as in step S32 of FIG. 6. Based on the location of the mobile device detected again, the determining unit 56 determines whether the specific operation has been performed at the specific location as in step S34. In this manner, after the location of the mobile device 100 is determined to be a specific location, an instruction is issued to the user to perform a specific operation. In a case where the location of the mobile device 100 is again determined to be the specific location after the user performs the specific operation, the determining unit 56 determines that the specific operation has been performed at the specific location. In this manner, a check can be made to determine, with a higher degree of accuracy, whether a specific operation has been performed at a specific location.

Embodiment 3

Figure 7:
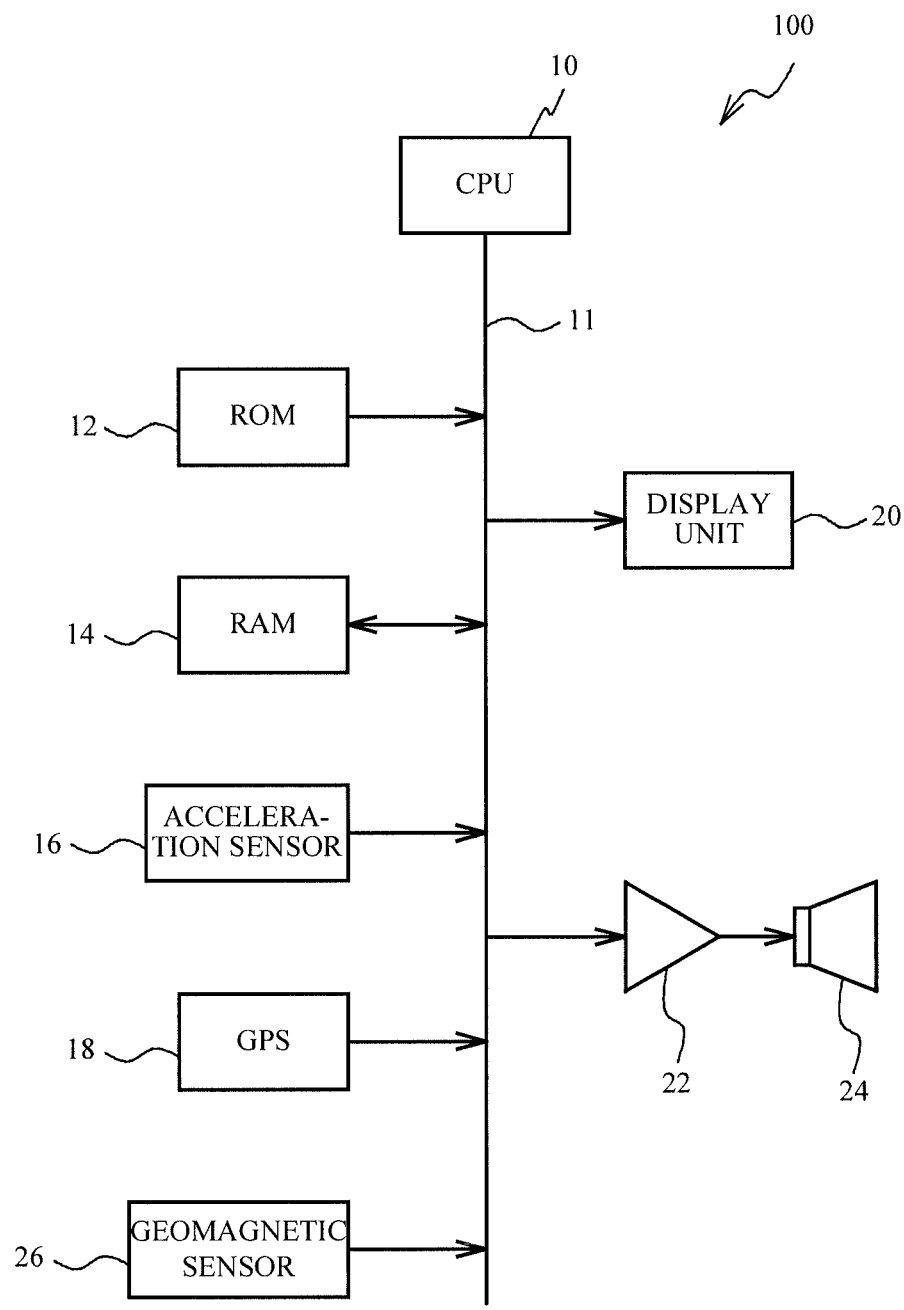
FIG. 7 is a block diagram of a mobile device according to Embodiment 3.

Embodiment 3 is an example in which a specific location is presented to users. FIG. 7 is a block diagram of a mobile device according to Embodiment 3. As shown in FIG. 7, the mobile device 100 includes a geomagnetic sensor 26. The geomagnetic sensor 26 detects geomagnetism. The other components are the same as those of Embodiment 1 illustrated in FIG. 2, and explanation of them is omitted herein.

Figure 8:
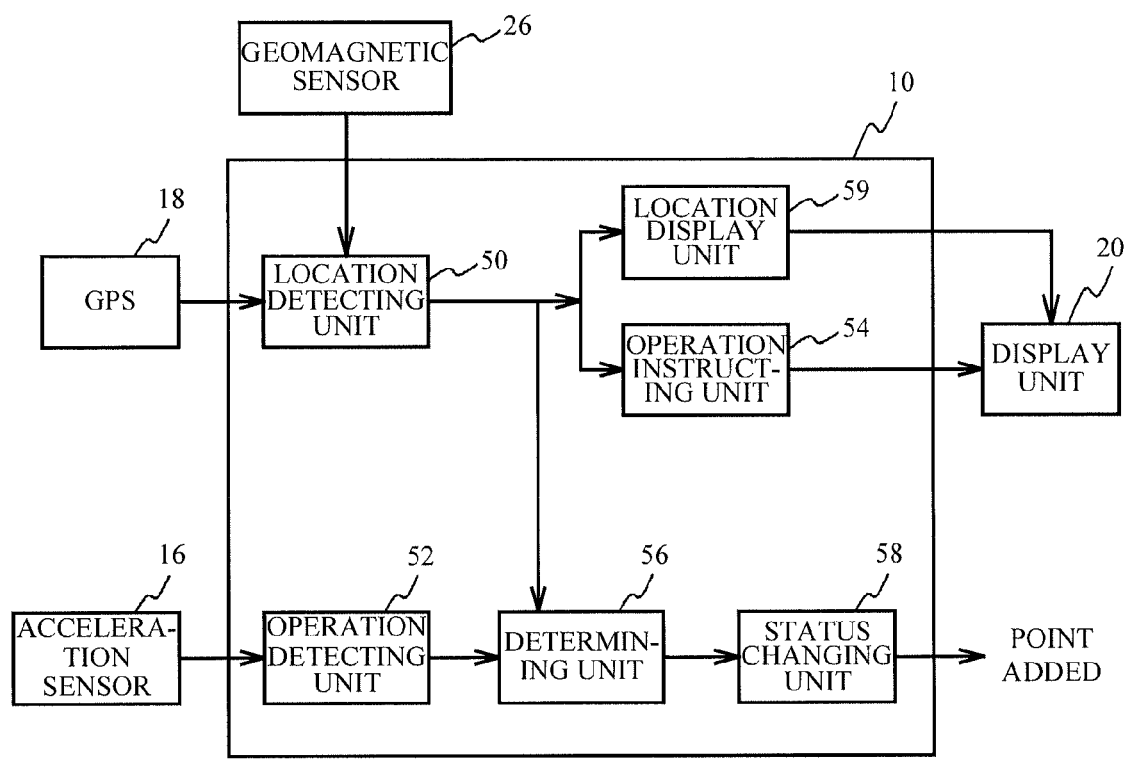
FIG. 8 is a functional block diagram of the mobile device according to Embodiment 3.

FIG. 8 is a functional block diagram of the mobile device according to Embodiment 3. As shown in FIG. 8, the CPU 10 or a computer functions as the location detecting unit 50. The location detecting unit 50 can recognize the orientation of the mobile device 100 from an output from the geomagnetic sensor. Based on the location and orientation detected by the location detecting unit 50, a location display unit 59 displays the current location of the mobile location 100 and a specific location on the display unit 20.

Figure 9:
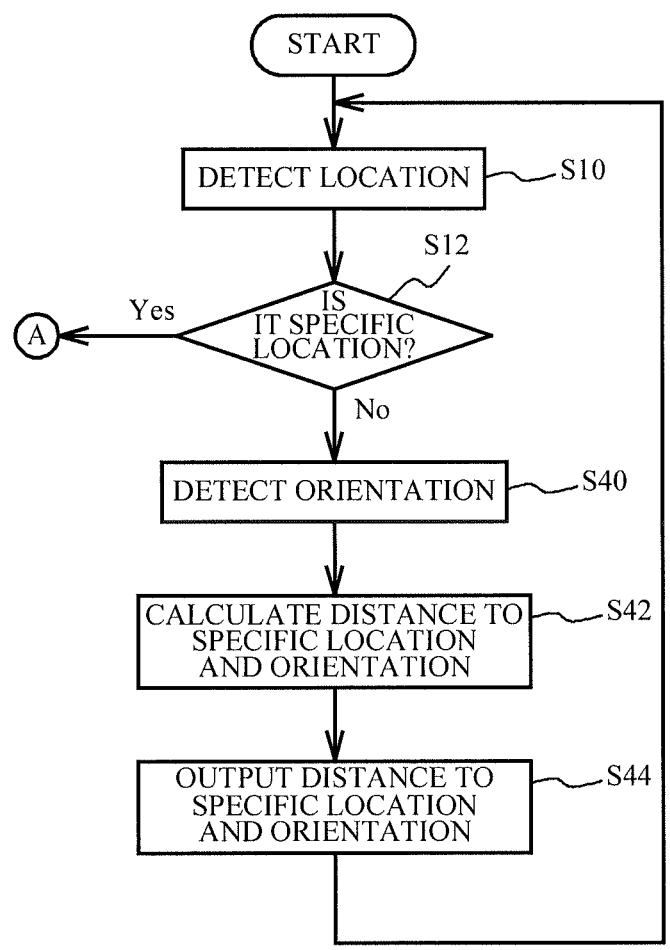
FIG. 9 is a flowchart (part 1) showing an operation to be performed by the mobile device according to Embodiment 3.
Figure 10:
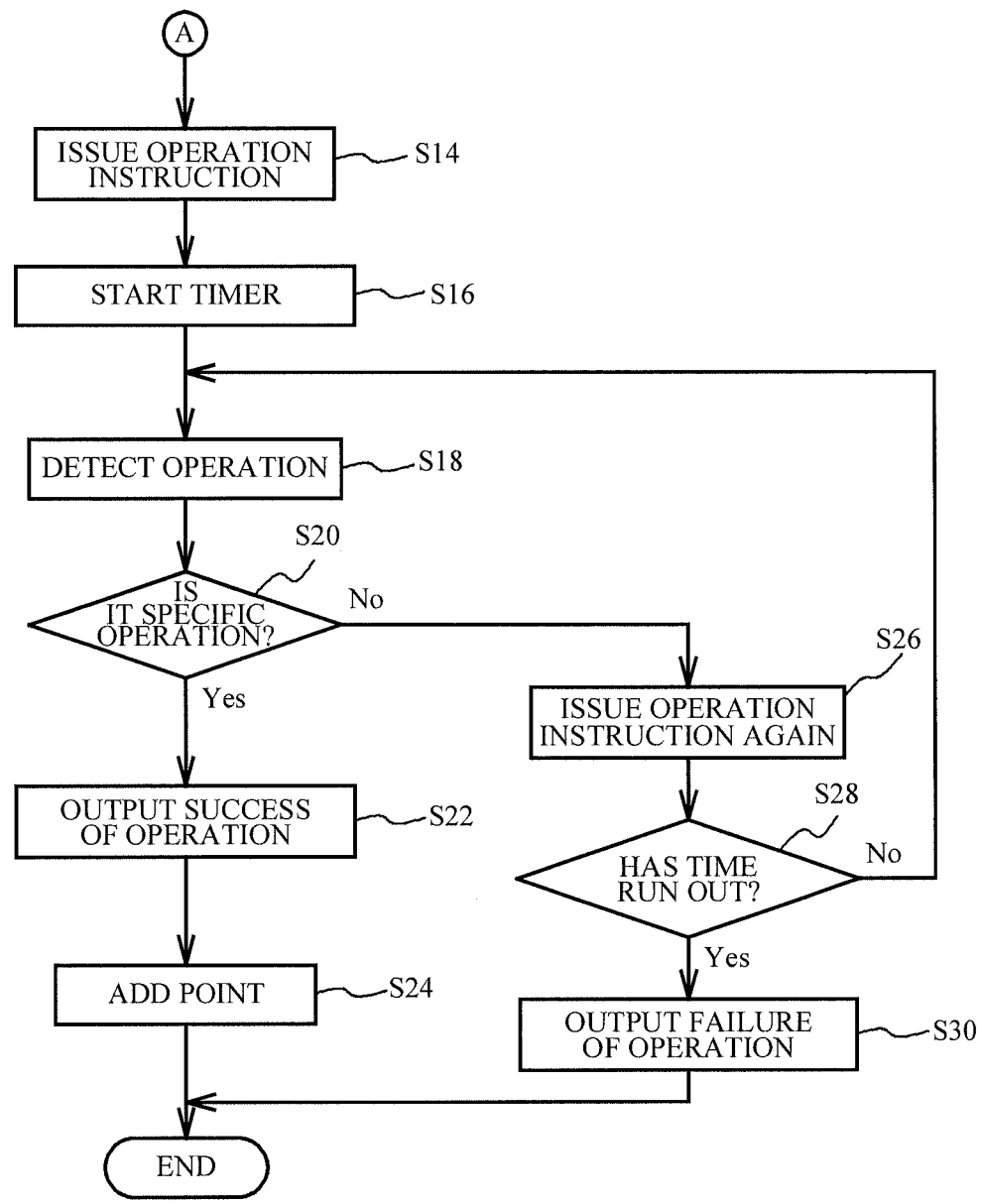
FIG. 10 is a flowchart (part 2) showing the operation to be performed by the mobile device according to Embodiment 3.

FIGS. 9 and 10 are flowcharts showing an operation to be performed by the mobile device according to Embodiment 3. Referring now to FIG. 9, the location detecting unit 50 detects the location of the mobile device 100 (step S10). The location detecting unit 50 determines whether the detected location is a specific location (step S12). If the result indicates "No," the location detecting unit 50 detects the orientation of the mobile device 100, from an output from the geomagnetic sensor 26 (step S40). For example, the location detecting unit 50 detects which direction among the east, west, south, and north the top of the display unit 20 of the mobile device 100 is oriented. Based on the detected location and orientation of the mobile device 100, the location detecting unit 50 calculates the distance to the specific location and the orientation of the specific location (step S42). Based on the calculation result, the location display unit 59 outputs the distance to the specific location and the orientation to the display unit 20 (step S44). If the result of step S12 indicates "Yes," the operation moves on to A of FIG. 10. Referring to FIG. 10, step S14 and the later steps are the same as steps S14 through S30 of Embodiment 1 illustrated in FIG. 4, and explanation of them is omitted herein.

Figure 11A:
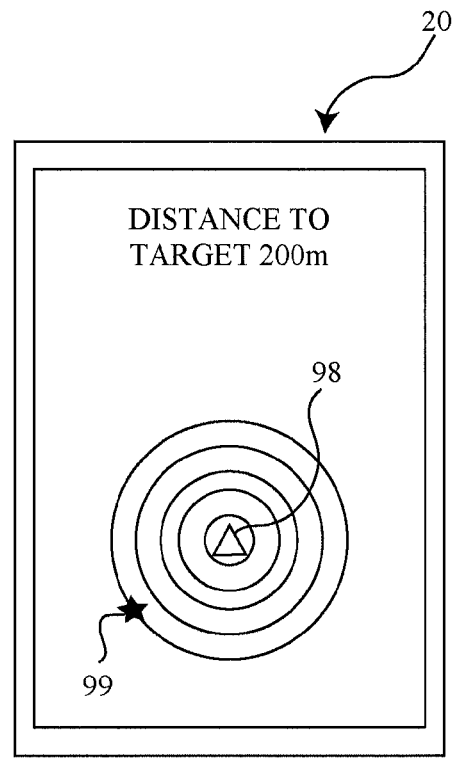
FIGS. 11A and 11B show example images displayed on the display unit in step S44 of FIG. 9.
Figure 11B:
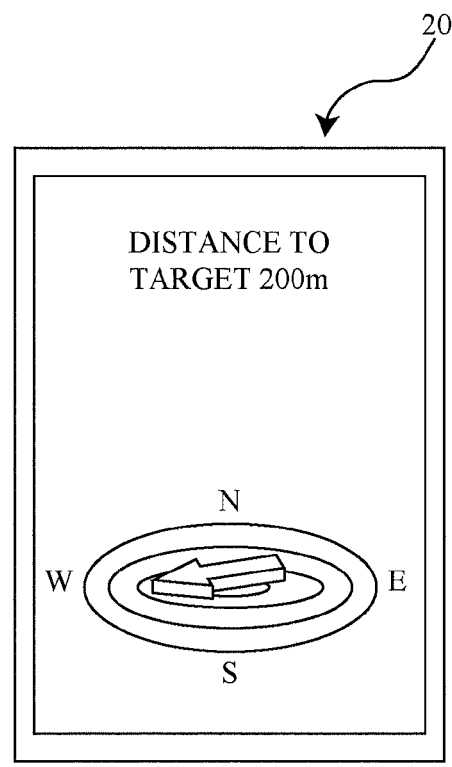

FIGS. 11A and 11B are example images displayed on the display unit in step S44 of FIG. 9. In the example shown in FIG. 11A, a current location 98 of the mobile device 100 is marked with a triangle. Concentric circles about the triangle are displayed, and a specific location 99 is marked with a star in the concentric circles. The distance from the current location 98 to the specific location 99 can be recognized from the location of the star. Alternatively, the distance to the specific location (described as "TARGET" in FIG. 11A) may be indicated by a number. More than one specific location may be displayed. In the example shown in FIG. 11B, the distance to a specific location is indicated by a number, and the orientation is shown by the arrow of a compass. In this example, the top of the display unit 20 of the mobile device 100 faces north. It should be noted that a specific location may be presented to users through audio information using the speaker 24 or through both audio information and a displayed image.

According to Embodiment 3, the location display unit 59 displays a specific location to users, based on the location of the mobile device detected by the location detecting unit 50 and a specific location, as in step S44 of FIG. 9. Accordingly, users can recognize the specific location, and can feel more excitement for the game.

Embodiment 4

Figure 12:
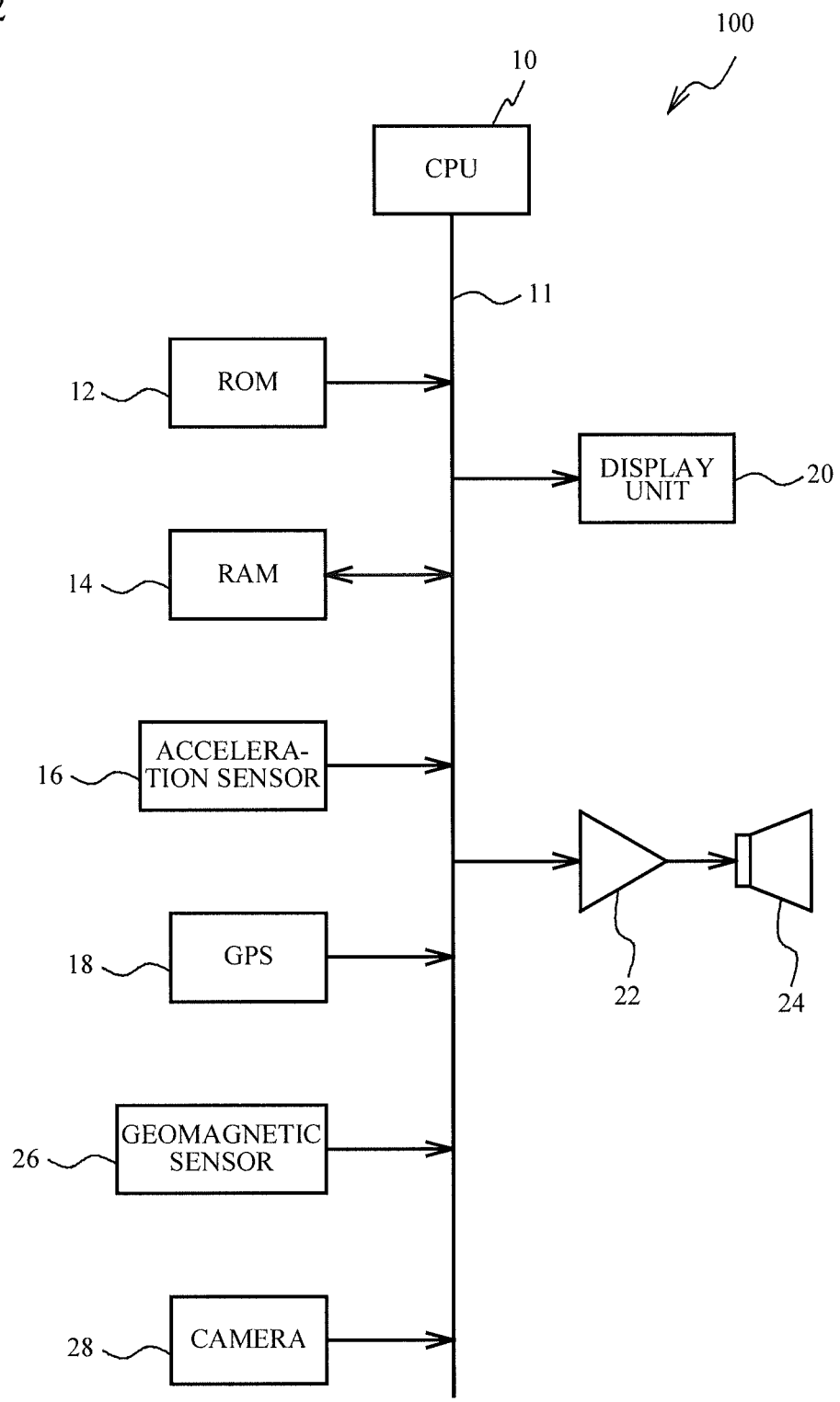
FIG. 12 is a block diagram of a mobile device according to Embodiment 4.

Embodiment 4 is an example in which an image of a location in the vicinity of a specific location and an image indicating a specific location are superimposed on each other and are displayed. FIG. 12 is a block diagram of a mobile device according to Embodiment 4. As shown in FIG. 12, the mobile device 100 includes a camera 28. Pictures of locations in the vicinity of the mobile device 100 can be taken with the camera 28, for example. The other components are the same as those of Embodiment 3 illustrated in FIG. 7, and explanation of them is omitted herein. The mobile device 100 can be illustrated in the same functional block diagram as that of Embodiment 3 shown in FIG. 8, and explanation thereof is omitted herein.

Figure 13:
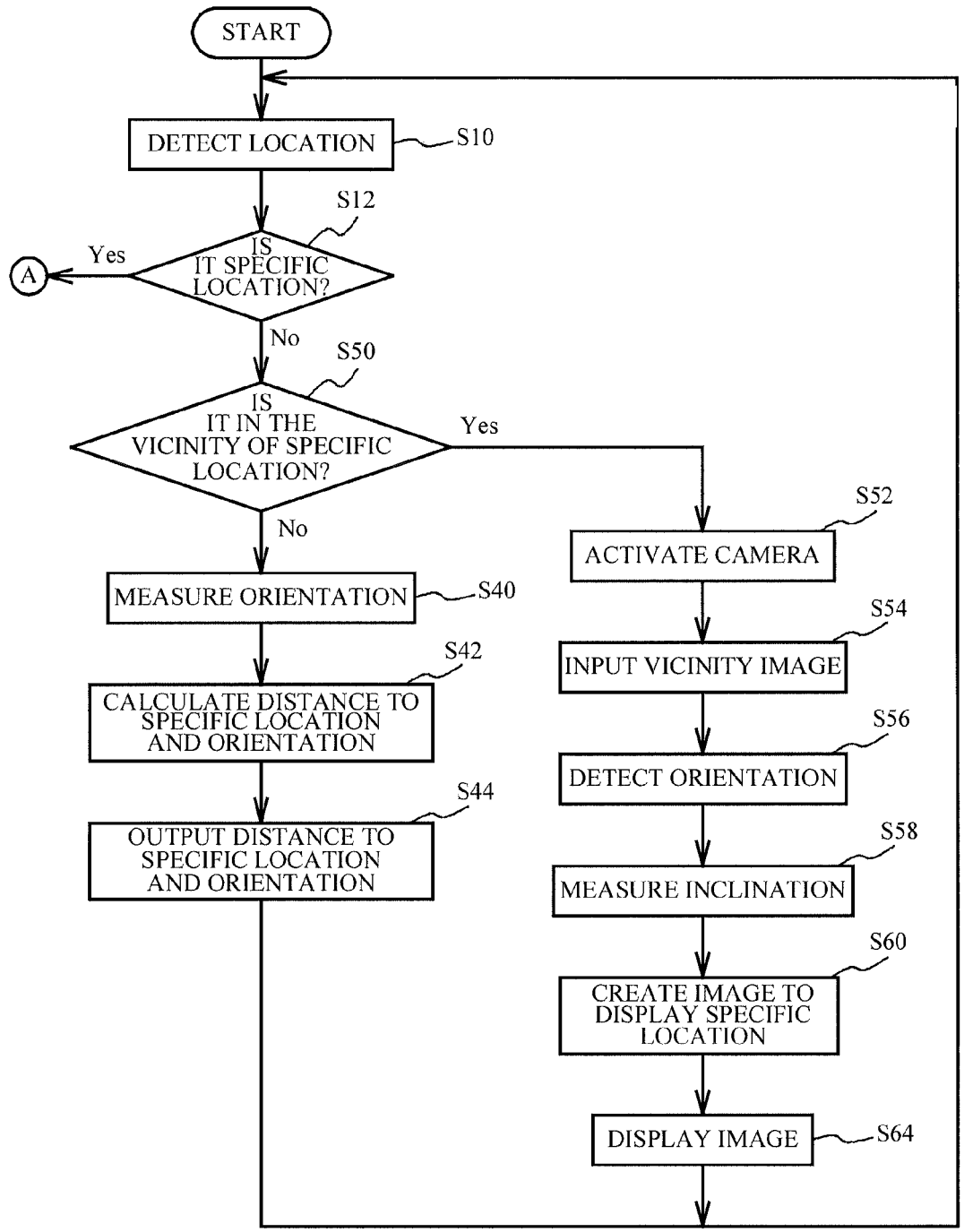
FIG. 13 is a flowchart showing an operation to be performed by the mobile device according to Embodiment 4.

FIG. 13 is a flowchart showing an operation to be performed by the mobile device of Embodiment 4. If the result of step S12 of FIG. 9 illustrating Embodiment 3 indicates "No," the location detecting unit 50 determines whether the detected location of the mobile device 100 is in the vicinity of a specific location (step S50). If a specific location is within a certain distance from the current location, the location detecting unit 50 can determine that the location of the mobile device 100 is in the vicinity of a specific location. If the result indicates "No," the operation moves on to step S40. If the result indicates "Yes," the camera 28 is activated (step S52). A user uses the camera 28, to display a vicinity image on the screen. The location detecting unit 50 obtains the vicinity image from the camera 28 (step S54). The geomagnetic sensor 26 measures the orientation of the mobile device 100 (step S56). The acceleration sensor 16 measures the inclination of the mobile device 100 (step S58). Based on the location and orientation of the mobile device 100 detected while the camera 28 is displaying the vicinity image, the location detecting unit 50 calculates the specific location in the vicinity image. The vicinity image and the image showing the specific location are superimposed on each other. By doing so, the location detecting unit 50 creates an image to display the specific location (step S60). The location display unit 59 displays the created image to the display unit 20 (step S64). The operation then returns to step S10. The other steps are the same as those of Embodiment 3 shown in FIGS. 9 and 10, and explanation of them is omitted herein.

Figure 14:
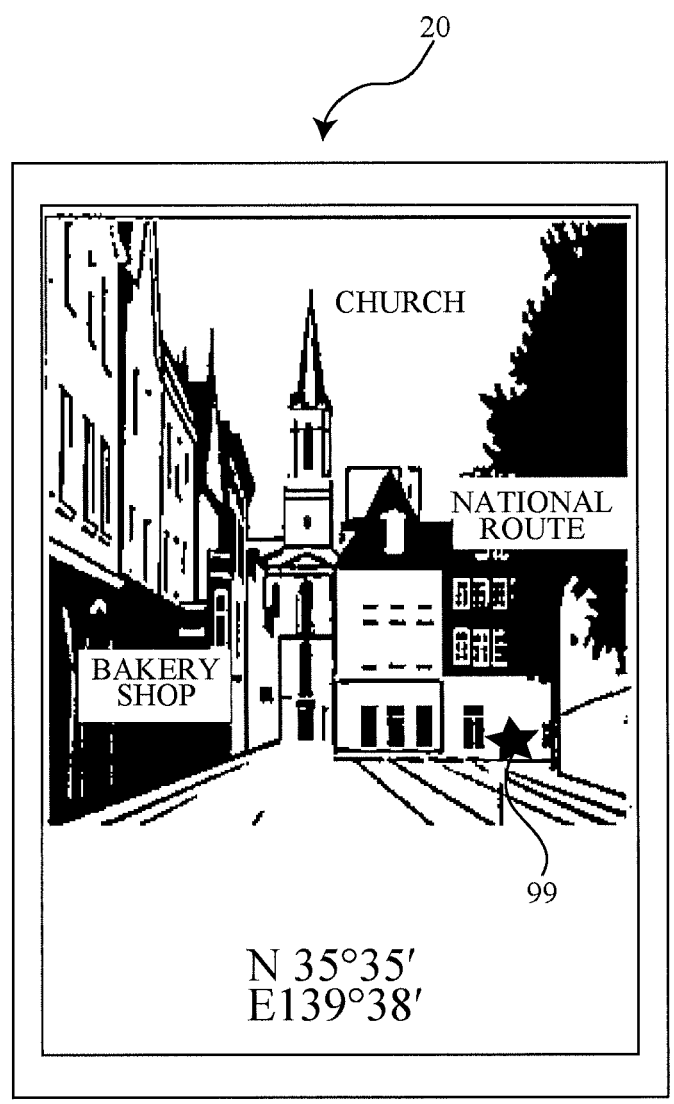
FIG. 14 shows an example image displayed on the display unit in step S64 of FIG. 13.

FIG. 14 is an example image displayed on the display unit 20 in step S64 of FIG. 13. An image of a church and a bakery shop is displayed as a vicinity image of the mobile device 100 on the display unit 20. A specific location 99 marked with a star is superimposed on the vicinity image, and is displayed.

According to Embodiment 4, the location display unit 59 superimposes an image indicating the specific location 99 on a vicinity image of the mobile device 100, and displays the superimposed image on the display unit 20. Accordingly, users can recognize the specific location while feeling more excitement for the game. It should be noted that the image indicating the specific image may not be a star but may be a character in the game or a letter or the like.

Embodiment 5

Figure 15:
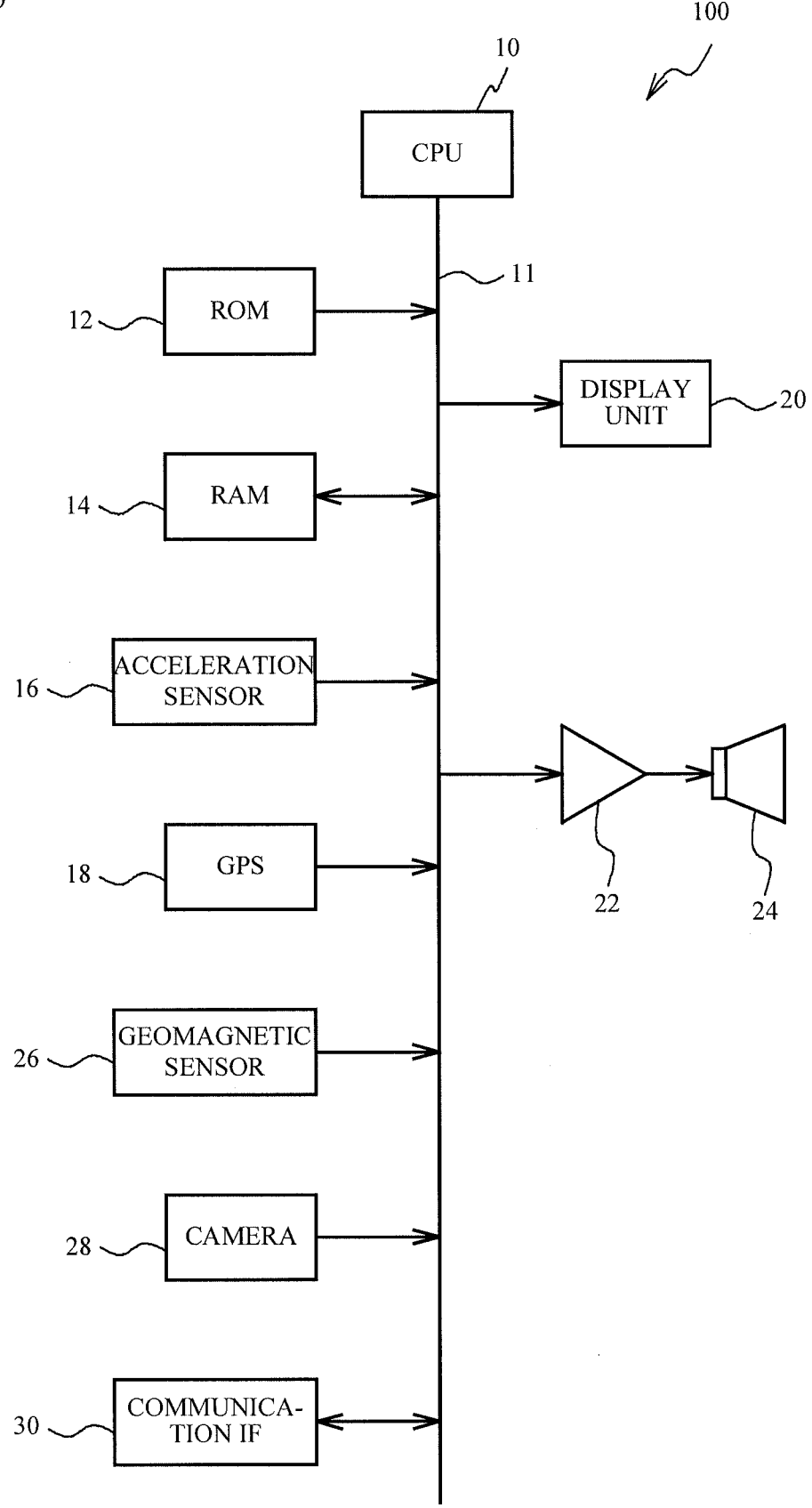
FIG. 15 is a block diagram of a mobile device according to Embodiment 5.

Embodiment 5 is an example in which an image of a location in the vicinity of a specific image and an image indicating a specific location are superimposed on each other at a remote center. FIG. 15 is a block diagram of a mobile device according to Embodiment 5. As shown in FIG. 15, the mobile device 100 includes a communication IF (interface) 30 as a communicating unit. The communication IF 30 transmits and receives information to and from the remote center 110 via the base station 104 and the network 106 shown in FIG. 1. The other components are the same as those of Embodiment 4 illustrated in FIG. 12, and explanation of them is omitted herein. The mobile device 100 can be illustrated in the same functional block diagram as that of Embodiment 3 in FIG. 8, and explanation thereof is omitted herein.

Figure 16:
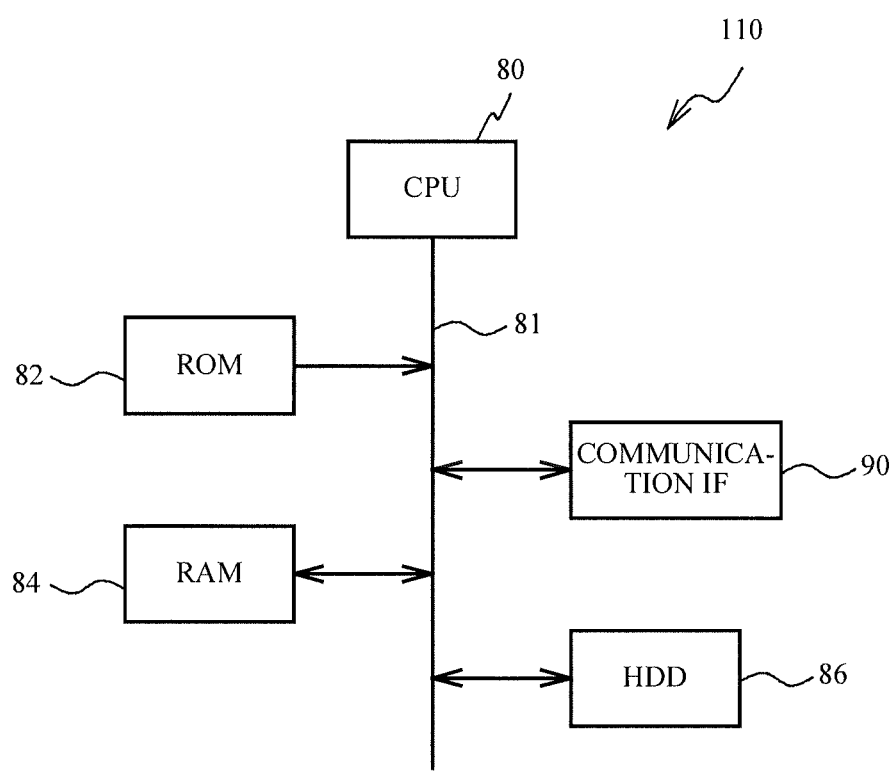
FIG. 16 is a block diagram of a center according to Embodiment 5.

FIG. 16 is a block diagram of the center. As shown in FIG. 16, the remote center 110 includes a CPU 80, a ROM 82, a RAM 84, a HDD (Hard Disk Drive) 86, a communication IF 90, and a bus 81 connecting those components. The remote center 110 is a server, for example. The ROM 82, which is an exemplary computer readable storage medium, stores programs, map data, and the like. The RAM 84 temporarily stores various kinds of information. Alternatively, the RAM 84 may be a nonvolatile memory. The HDD 86 stores various kinds of information for a long period of time. The communication IF 90 transmits and receives information to and from the mobile device 100 via the network 106 and the base station 104 shown in FIG. 1. The CPU 80 controls those functions.

Figure 17:
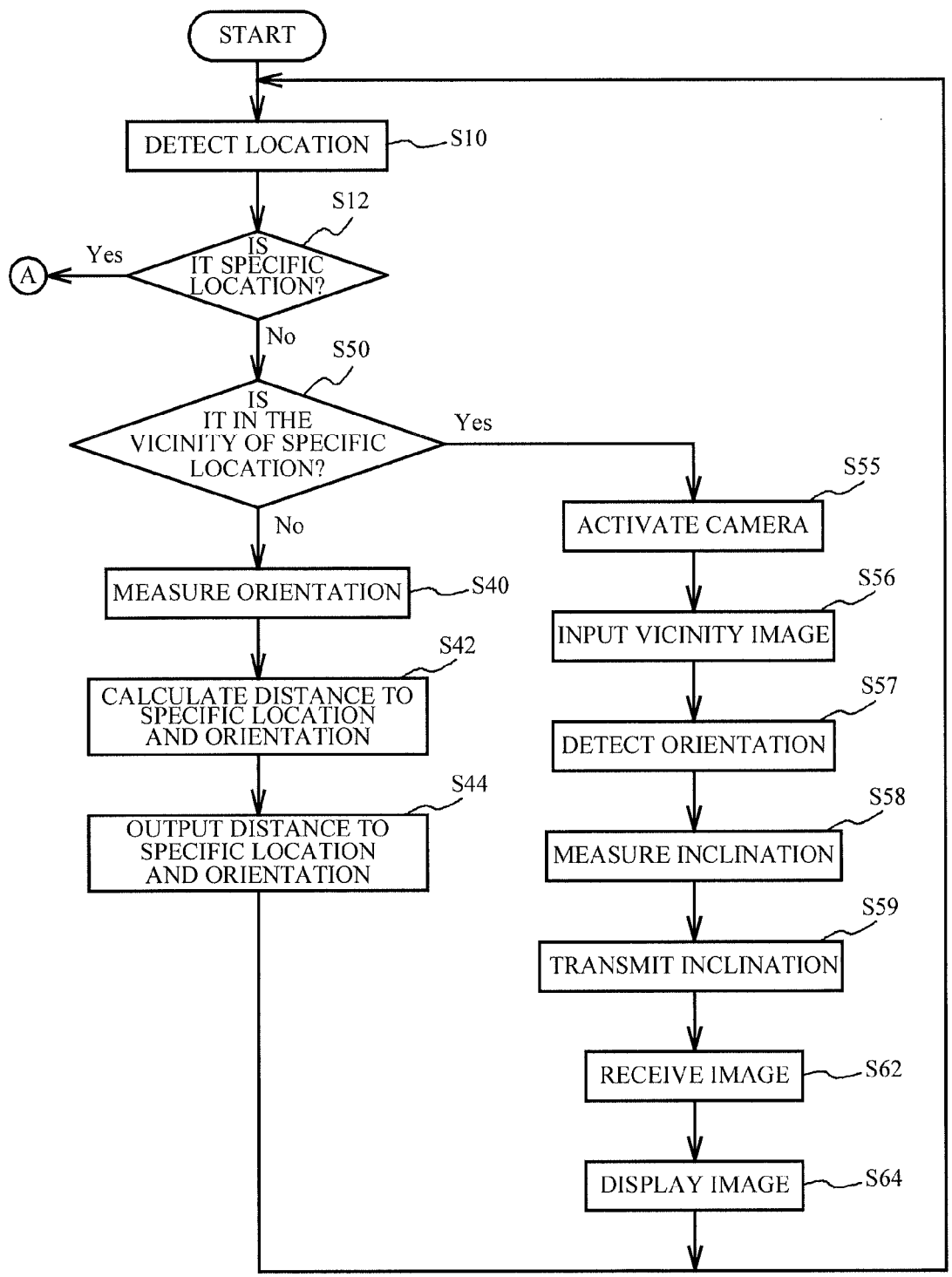
FIG. 17 is a flowchart showing an operation to be performed by the mobile device according to Embodiment 5.

FIG. 17 is a flowchart showing an operation to be performed by the mobile device according to Embodiment 5. Referring to FIG. 17, when the result of step S50 indicates "Yes," the communication IF 30 transmits the location of the mobile device 100 detected by the location detecting unit 50 to the center 110 (step S55). The geomagnetic sensor 26 measures the orientation of the mobile device 100 (step S56). The communication IF 30 transmits information about the measured orientation to the center 110 (step S57). The acceleration sensor 16 measures the inclination of the mobile device 100 (step S58). The communication IF 30 transmits information about the measured inclination to the center 110 (step S59). The communication IF 30 receives image information from the center 110 (step S62). The location display unit 59 displays the received image on the display unit 20. The operation then returns to step S10. The other steps are the same as those of Embodiment 5 shown in FIG. 13, and explanation of them is omitted herein.

Figure 18:
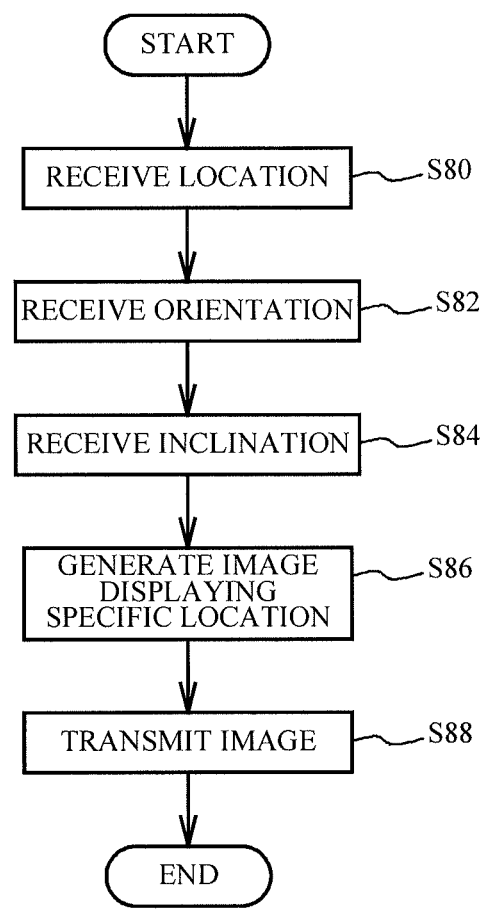
FIG. 18 is a flowchart showing an operation to be performed by the center according to Embodiment 5.

FIG. 18 is a flowchart showing an operation to be performed by the center according to Embodiment 5. Referring to FIG. 18, the communication IF 90 receives the information about the location of the mobile device 100 transmitted from the mobile device 100 in step S55 of FIG. 17 (step S80). The communication IF 90 then receives the information about the orientation transmitted from the mobile device 100 in step S57 of FIG. 17 (step S82). The communication IF 90 further receives the information about the inclination transmitted from the mobile device 100 in step S59 of FIG. 17 (step S84). Based on the information about the location, orientation, and inclination of the mobile device 100 received by the communication IF 90, the CPU 80 obtains an image of a location in the vicinity of the mobile 100 from the HDD 86. This image may be an image that was actually captured, or an image synthesized by computer graphics. An image of a specific location is superimposed on the image of the location in the vicinity of the mobile device 100. The image of the location in the vicinity of the mobile device 100 can be stored beforehand in the HDD 86. With this arrangement, an image displaying a specific location is generated (step S86). The communication IF 90 transmits the image created by the CPU 80 to the mobile device 100 (step S88). In step S62 of FIG. 17, the mobile device 100 receives the image transmitted from the communication IF 90. The operation then comes to an end.

The mobile device 100 preferably reduces the information processing load, so as to reduce the power consumption and size. According to Embodiment 5, the center 110 creates an image by superimposing an image indicating a specific location on an image of a location in the vicinity of the mobile device 100, as in step S86 of FIG. 18. As in step S62 of FIG. 17, the communication IF 30 receives the image created by the center 110. As in step S64, the location display unit 59 displays the received image on the display unit 20. As the center creates an image by superimposing an image indicating a specific image on an image of a location in the vicinity of the mobile device 100 as described above, the load on the CPU 10 of the mobile device 100 can be reduced.

Embodiment 6

Figure 19:
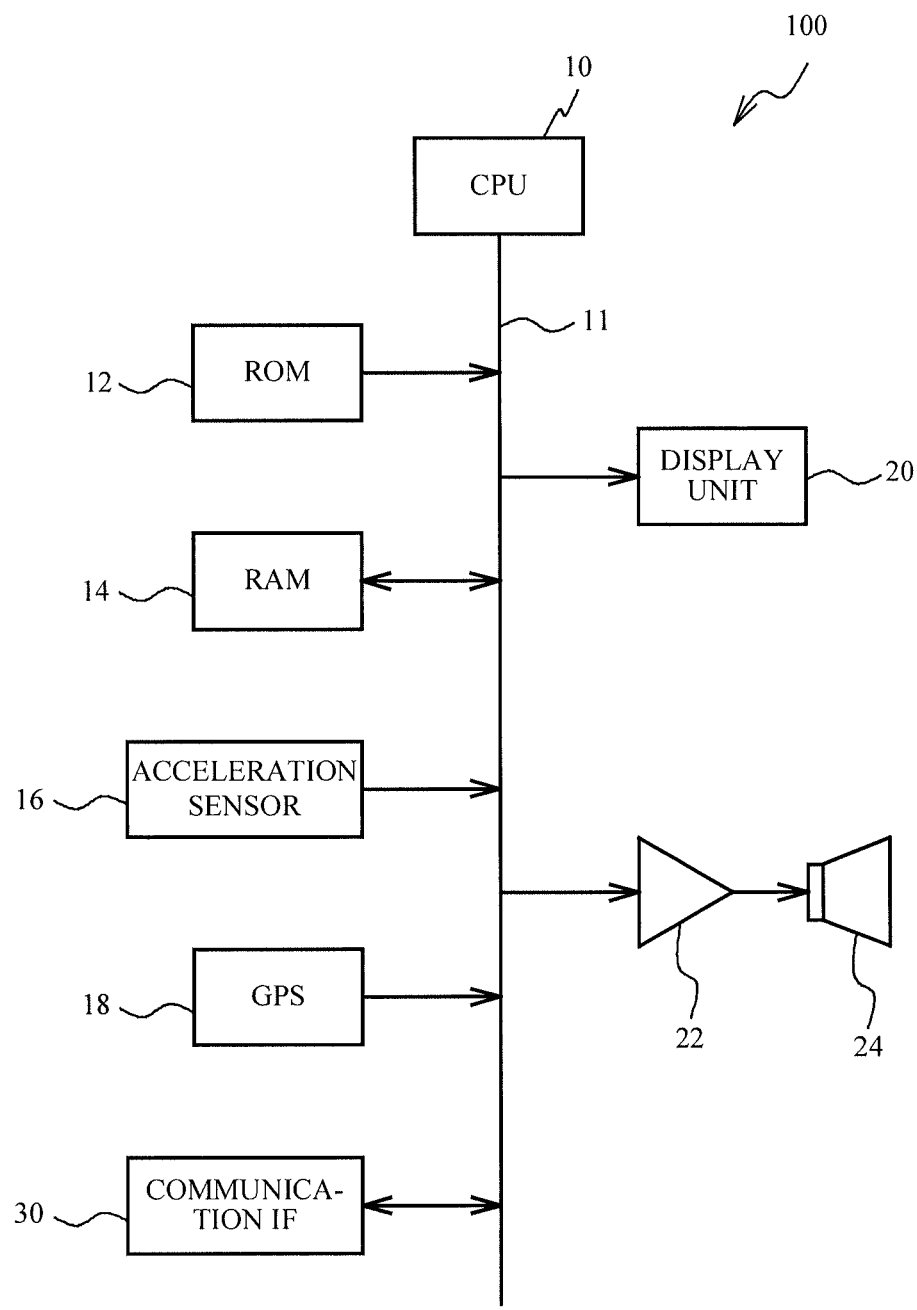
FIG. 19 is a block diagram of a mobile device according to Embodiment 6.

Embodiment 6 is an example in which the center determines an operation instruction. FIG. 19 is a block diagram of a mobile device according to Embodiment 6. As shown in FIG. 19, the mobile device 100 includes a communication IF (interface) 30 as a communicating unit. The communication IF 30 transmits and receives information to and from the remote center 110 via the base station 104 and the network 106 shown in FIG. 1. The other components are the same as those of Embodiment 1 illustrated in FIG. 2, and explanation of them is omitted herein. The mobile device 100 can be illustrated in the same functional block diagram as that of Embodiment 1 in FIG. 3, and explanation thereof is omitted herein. The center 110 can be illustrated in the same block diagram as that of Embodiment 5 in FIG. 16, and explanation thereof is omitted herein.

Figure 20:
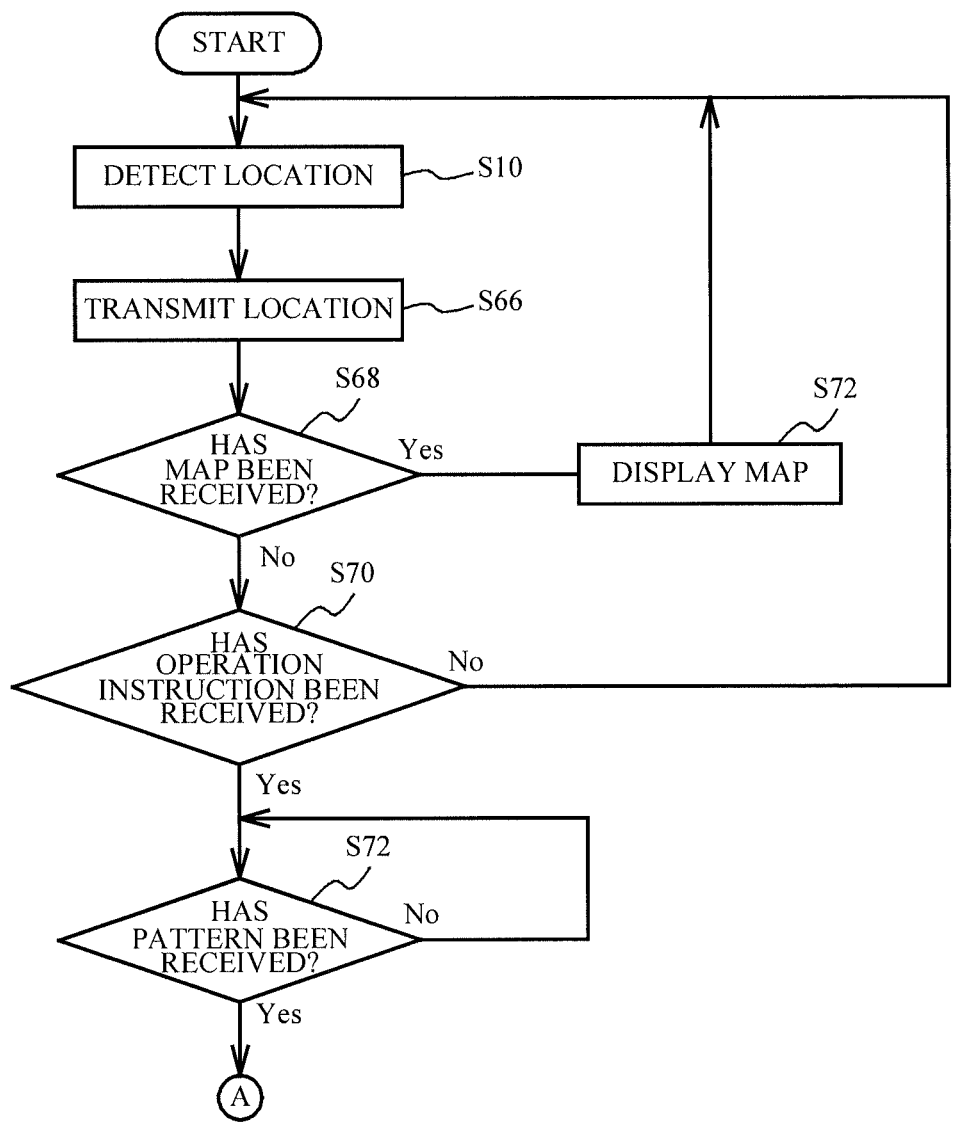
FIG. 20 is a flowchart showing an operation to be performed by the mobile device according to Embodiment 6.

FIG. 20 is a flowchart showing an operation to be performed by the mobile device according to Embodiment 6. Referring to FIG. 20, the location detecting unit 50 detects the location of the mobile device 100 (step S10). The communication IF 30 transmits information about the location detected by the location detecting unit 50 to the center 110 (step S66). The location detecting unit 50 determines whether the communication IF 30 has received map image information from the center 110 (step S68). If the result indicates "Yes," the location display unit 59 displays the received map image on the display unit 20 (step S72). The operation then returns to step S10.

If the result of step S68 indicates "No," the operation instructing unit 54 determines whether information about an operation instruction has been received from the center 110 (step S70). The information about an operation instruction is information about an image to be displayed on the display unit 20 by the operation instructing unit 54 in step S14 of FIG. 10, for example. Alternatively, the image about an operation instruction is information indicative of the contents of a specific operation a user is to be prompted to perform. If the result indicates "No," the operation returns to step S10. If the result indicates "Yes," the operation detecting unit 52 determines whether information about a pattern of the acceleration sensor 16 has been received from the center 110 (step S72). The information about the pattern of the acceleration sensor 16 is an output pattern of the acceleration sensor 16 to be used by the operation detecting unit 52 to determine whether a specific operation has been performed in step S20 of FIG. 10, for example. If the result indicates "No," the operation returns to step S72. If the result indicates "Yes," the operation moves on to step S14 of FIG. 10. The steps to be carried out thereafter are the same as those of Embodiment 3 shown in FIG. 10, and explanation of them is omitted herein.

Figure 21:
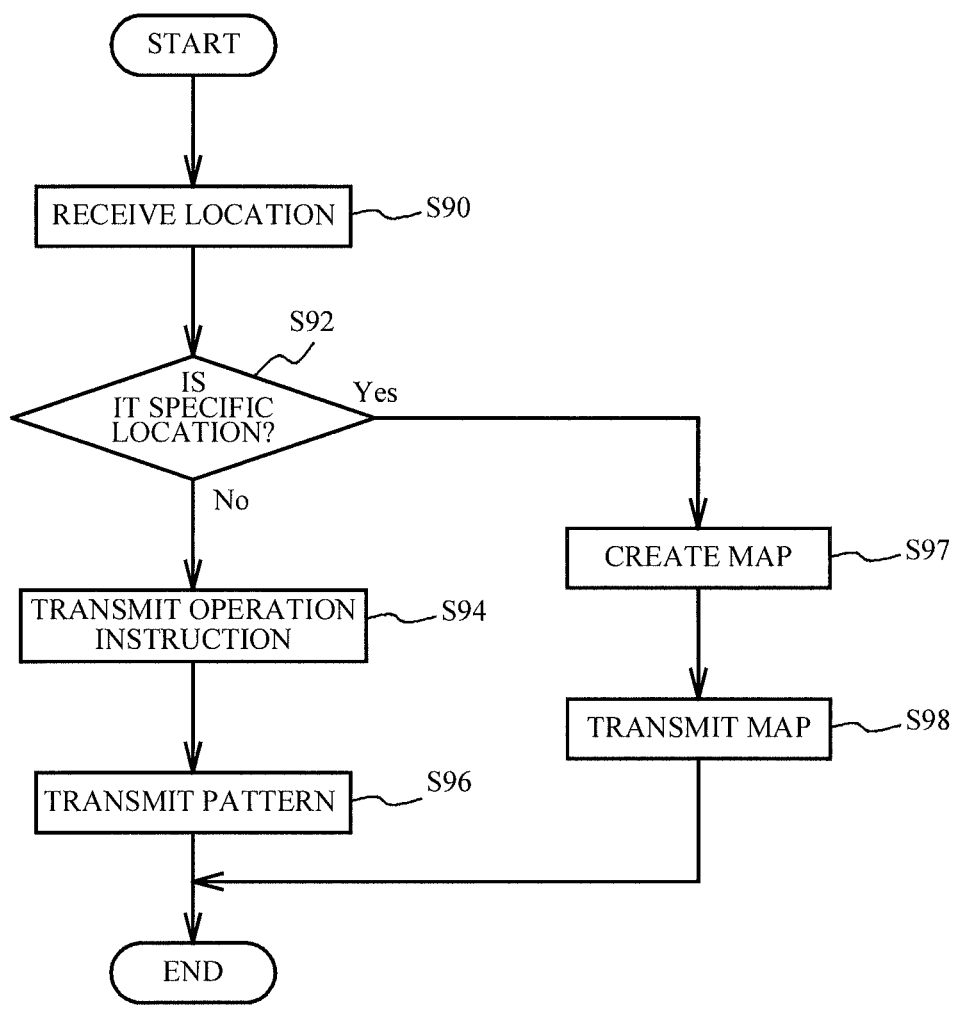
FIG. 21 is a flowchart showing an operation to be performed by a center according to Embodiment 6.

FIG. 21 is a flowchart showing an operation to be performed by the center according to Embodiment 6. Referring to FIG. 21, the communication IF 90 receives the information about the location of the mobile device 100 transmitted from the mobile device 100 in step S66 of FIG. 20 (step S90). The CPU 80 determines whether the received location of the mobile device 100 is a specific location (step S92). If the result indicates "No," the CPU 80 creates a map image showing the location of the mobile device 100 and a specific location (step S97). The communication IF 90 transmits the information about the created map image to the mobile device 100. In step S68 of FIG. 20, the mobile device 100 receives the information about the map image.

If the result of step S92 indicates "Yes," the communication IF 90 transmits information about an operation instruction to prompt the user to perform a specific operation (step S94). In step S70 of FIG. 20, the mobile device 100 receives the information about the operation instruction. The communication IF transmits a pattern of the acceleration sensor 16 to the mobile device 100 (step S96). In step S72 of FIG. 20, the mobile device 100 receives the information about the pattern of the acceleration sensor 16.

According to Embodiment 6, the communication IF 30 transmits information about the location of the mobile device 100 detected by the location detecting unit 50 to the center 110, as in step S66 of FIG. 20. As in step S70, the communication IF 30 receives, from the center 110, information about a specific operation the user is to be prompted to perform by the operation instructing unit 54. As the center 110 determines a specific operation the user is to be prompted to perform in the above manner, the mobile device 100 does not need to store information about the specific operation in advance. Also, as in step S 90 of FIG. 21, the center 110 determines whether the detected location is a specific location. Accordingly, the mobile device 100 does not need to store information about the specific location in advance. Further, as in step S96 of FIG. 21, the center 110 transmits a pattern of the acceleration sensor to the mobile device 100. Accordingly, the mobile device 100 does not need to store information about the pattern. As described above, information about a specific operation, information about a specific location, and a pattern of the acceleration sensor can be stored in the HDD or the like of the center 110. Accordingly, the capacity of the RAM 14 of the mobile device 100 is reduced, so that the power consumption by the mobile device 100 and the size of the mobile device 100 can be reduced.

Embodiment 7

Embodiment 7 is an example in which the center determines the contents of a change in the status of a mobile device. The mobile device according to Embodiment 7 can be illustrated in the same block diagram as that of Embodiment 6 in FIG. 19, and the center can be illustrated in the same block diagram as that of Embodiment 5 in FIG. 16. Explanation based on those block diagrams is omitted herein. The mobile device 100 can be illustrated in the same functional block diagram as that of Embodiment 3 in FIG. 8, and explanation thereof is omitted herein.

Figure 22:
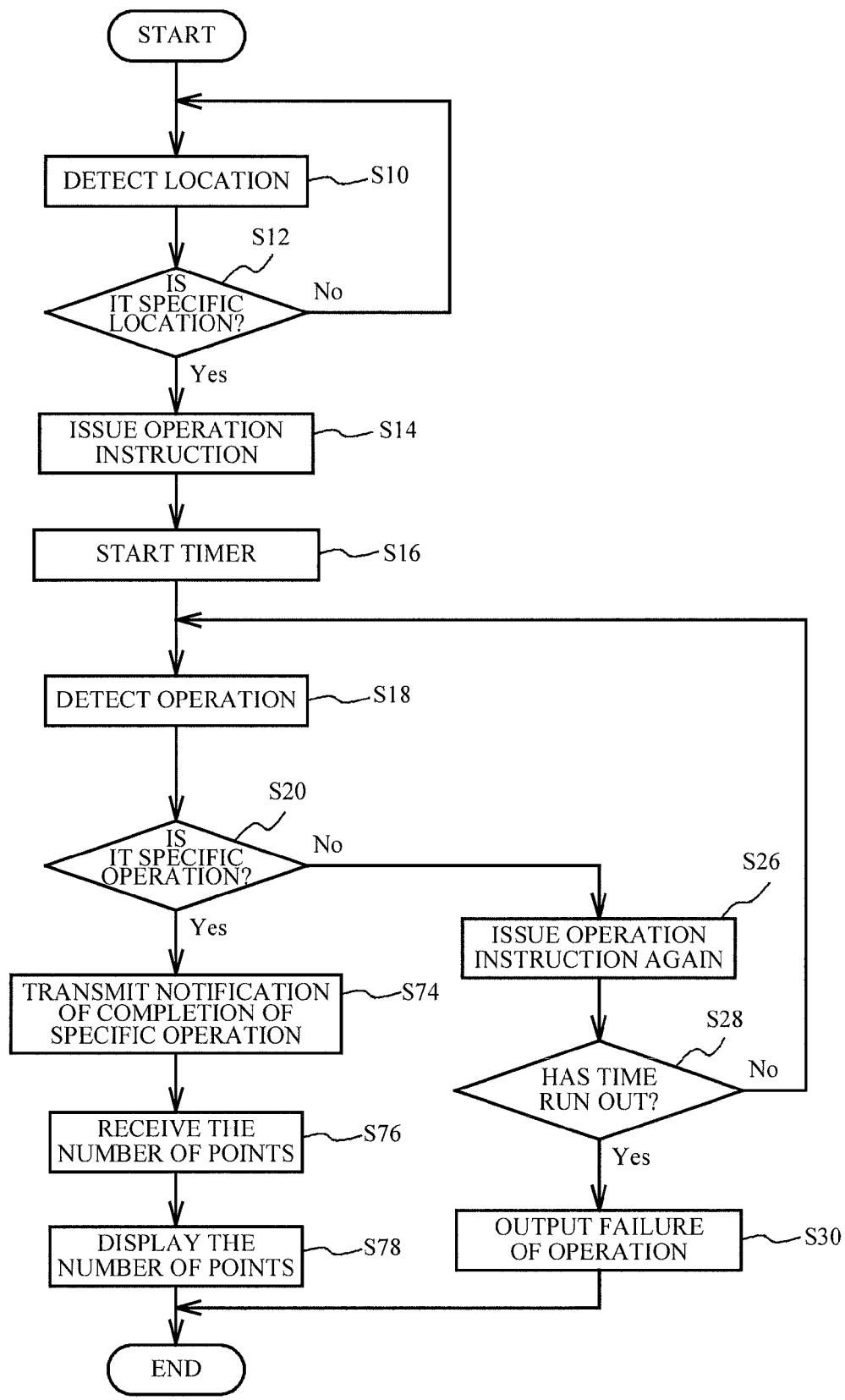
FIG. 22 is a flowchart showing an operation to be performed by a mobile device according to Embodiment 7.

FIG. 22 is a flowchart showing an operation to be performed by the mobile device according to Embodiment 7. If the result of step S20 indicates "Yes," the communication IF 30 transmits to notify the center 110 that a specific operation by the user has been completed (step S74). The communication IF 30 receives information about the number of points from the center 110 (step S76). The status changing unit 58 displays the received number of points on the display unit 20 (step S78). The other steps are the same as those of Embodiment 1 shown in FIG. 4, and explanation of them is omitted herein.

Figure 23:
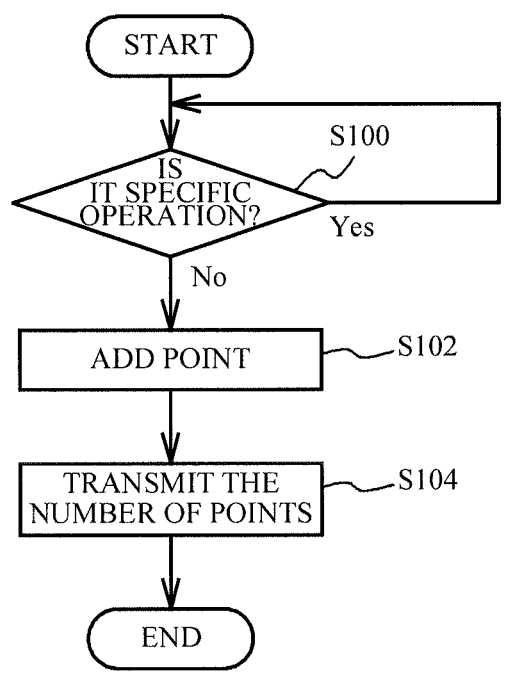
FIG. 23 is a flowchart showing an operation to be performed by a center according to Embodiment 7.

FIG. 23 is a flowchart showing an operation to be performed by the CPU 80 or the computer of the center 110. Referring to FIG. 23, the communication IF 90 determines whether the notification of completion of a specific operation transmitted from the mobile device 100 in step S74 of FIG. 22 has been received (step S100). If the result indicates "No," the operation returns to step S100. If the result indicates "Yes," the CPU 80 adds a new point to the points accumulated in the HDD 86 (step S102). The communication IF 90 transmits information about the number of points to the mobile device 100 (step S104). In step S78 of FIG. 22, the mobile device 100 receives the information about the number of points.

According to Embodiment 7, in a case where the determining unit 56 determines that a specific operation has been performed at a specific location as in step S20 of FIG. 22, the communication IF 30 transmits to notify the center 110 that a specific operation has been performed at a specific location as in step S74. As in steps S76 and S78, the status changing unit 58 changes the status of the mobile device 100, based on an instruction from the center 110. Accordingly, the center 110 can store the points, for example, and the resource of the mobile device 100 can be saved.

In the example described in Embodiment 5, the center 110 superimposes an image indicating a specific location on an image of a location in the vicinity of the specific location. In the example described in Embodiment 6, the center 110 determines an operation instruction to be issued to a user. In the example described in Embodiment 7, the center 110 determines the contents of a change in the status of the mobile device 100. The center 110 may perform all the above operations or may perform only part of the operations.

In Embodiments 1 through 7, the operation detecting units 52 detects the acceleration applied to the mobile device 100, to detect a specific operation of a user, for example. An example of a specific operation of a user is jumping in the above described embodiments. As described above, the acceleration applied to the mobile device 100 is detected, so that the user can adjust his/her body movement to a specific operation. Accordingly, the user can play a game by using his/her body, and can enjoy the game much more.

In Table 1, actions that can be detected by the acceleration sensor 16 are shown as examples of specific operations that are to be performed by users.

TABLE 1

| action |
| --- |
| walking |
| running |
| standing |
| sitting |
| standing up from a chair |
| sitting down (crouching) |
| jumping side to side |
| jumping |

Examples of actions that can be detected by the acceleration sensor 16 are shown in Table 1. As can be seen from Table 1, "walking" and "running" can be detected by the acceleration sensor 16. The acceleration sensor 16 can also count the user's steps. For example, "walking ten steps" can also be detected. Also, "standing" and "sitting" can be detected. Further, "standing up from a chair", "sitting down (or crouching) ", "jumping side to side", and "jumping" can be detected by the acceleration sensor 16. As a "jumping" action, "jumping with bounce while holding the device in one's hand" can also be detected by the acceleration sensor 16.

In Table 2, actions to move the mobile device 100 with one's hand that can be detected by the acceleration sensor 16 are shown as examples of specific operations that are to be performed by users.

TABLE 2

| action |
| --- |
| lifting it up or down |
| throwing it upward and catching it |
| moving it from left to right |
| drawing a character or number |

The acceleration sensor 16 can detect "lifting up or down" the mobile device 100. The acceleration sensor 16 can detect the difference between lifting the mobile device 100 up and lifting the mobile device 100 down. The acceleration sensor 16 can detect a height to which the mobile device is lifted up, or a height to which the mobile device is lifted down. In detecting heights, the acceleration sensor 16 can also classify heights into several classes, and determines to which class each height belongs.

The acceleration sensor 16 can also detect "throwing the mobile device 100 upward and catching the mobile device 100." The acceleration sensor 16 can also detect "moving the mobile device 100 from left to right." The acceleration sensor 16 can also determine whether the mobile device 100 is moved to the right or to the left. The acceleration sensor 16 can also detect the width of each movement from left to right. Further, the acceleration sensor 16 can classify widths into several classes, and determines each width. The acceleration sensor 16 can also detect "drawing a character or number" while holding the mobile device 100.

Table 3 shows functions that can detect specific locations, functions that can detect specific operations performed by users, and operations or information that can be detected by those functions.

TABLE 3

| usage | function | operation information |
| --- | --- | --- |
| human action | acceleration sensor | action |
| | pedometer | number of steps |
| | activity monitor | momentum |
| | keys | character/number input |
| | microphone | voice |
| | touch panel | input coordinates |
| | pulse checker | pulse rate |
| | fingerprint sensor | biometric authentification pointing |
| | gyro sensor | angular velocity |
| environment | GPS | latitude and longitude |
| | clock | time |
| | camera | image or QR code |
| | optical sensor | luminance |
| | barometer | atmospheric pressure, altitude, or altitude difference |

TABLE 3-continued

| usage | function | operation information |
| --- | --- | --- |
| | thermometer | temperature |
| | geomagnetic sensor | orientation |
| communication function | telephone | voice |
| | service area | existence of radio waves |
| | mail | text/image transmission or reception |
| | Internet | web access |
| | other | information reception |

Example cases where the operation detecting unit 52 detects an operation or information using a function to detect a human action are now described. Using the acceleration sensor as in Tables 1 and 2, the operation detecting unit 52 can detect an action of a user. Using a pedometer, the operation detecting unit 52 can detect the number of steps taken by a user walking or running. Using an activity monitor, the operation detecting unit 52 can detect the momentum of a user. Using keys, the operation detecting unit 52 can detect a character or number that has been input by a user. The operation detecting unit 52 can also detect whether a specific character or number has been input. Using a microphone, the operation detecting unit 52 can detect voice or the like of a user. The operation detecting unit 52 can also detect whether a specific sound has been emitted. Using a touch panel, the operation detecting unit 52 can detect the coordinates of a touch by a user. Using a pulse checker, the operation detecting unit 52 can detect the pulse rate of a user. Using a fingerprint sensor, the operation detecting unit 52 can detect a fingerprint of a user. For example, using a fingerprint that has been input from the fingerprint sensor, the mobile device 100 can perform biometric authentication and release the lock. Using a gyro sensor, the operation detecting unit 52 can detect an angular velocity applied to the mobile device 100.

Example cases where the location detecting unit 50 or the operation detecting unit 52 detects information using a function to detect information about a circumstance are now described. Using a GPS receiver, the location detecting unit 50 can detect information about the latitude and longitude. Using a clock, the location detecting unit 50 or the operation detecting unit 52 can detect the time. Using a camera, the location detecting unit 50 or the operation detecting unit 52 can detect an image or a QR code. Using an optical sensor, the location detecting unit 50 or the operation detecting unit 52 can detect the illuminance. Using a barometer, the location detecting unit 50 or the operation detecting unit 52 can detect the atmospheric pressure, the altitude, or an altitude difference. Using a thermometer, the location detecting unit 50 or the operation detecting unit 52 can detect the temperature. Using a geomagnetic sensor, the location detecting unit 50 can detect the orientation.

Example cases where the operation detecting unit 52 detects information using a communication function are now described. Using a telephone function, the operation detecting unit 52 can detect a voice via a telephone. The operation detecting unit 52 can also determine whether a specific telephone number has been called or whether a call has been received from a specific telephone number. Using a service area detecting function, the location detecting unit 50 can detect the existence of radio waves for mobile phones. Using a mail function, the operation detecting unit 52 can detect transmission or reception of a mail including a text or an image. The operation detecting unit 52 can also determine whether a mail has been transmitted to a specific mail address, or whether a mail has been received from a specific mail address. Using an Internet function, the operation detecting unit 52 can detect an access to a website. The operation detecting unit 52 can also determine whether an access has been made to a specific website. Using other communication functions, the operation detecting unit 52 can also detect information reception from a noncontact card, and information reception via a wireless function such as BlueTooth, for example.

The location detecting unit 50 or the operation detecting unit 52 can detect a specific location or a specific operation of a user by combining functions shown in Table 3. For example, in a case where the location detecting unit 50 or the operation detecting unit 52 is to detect "receiving a mail at the top of Mt. Fuji, and, at 15:00, making a 360-degree jump and shouting" as a specific operation performed at a specific location, the following operations are performed. Using the GPS receiver, the location detecting unit 50 determines that the location is on Mt. Fuji. Using the barometer, the location detecting unit 50 determines that the location is at the top. Using the mail function, the operation detecting unit 52 detects reception of a mail. Using the clock, the operation detecting unit 52 determines that the time is 15:00. Using the acceleration sensor and the gyro sensor, the operation detecting unit 52 detects a 360-degree jump. Using the microphone, the operation detecting unit 52 detects a shout.

Also, in a case where the location detecting unit 50 or the operation detecting unit 52 is to detect "going to an out-of-service place by walking 5000 steps or more at a temperature of 25° C. or lower, pressing keys sequentially from 1 to 9, increasing the pulse rate to 100 times/min by moving around on the spot, and then crouching down and taking a photo" as a specific operation performed at a specific location, the following operations are performed. Using the thermometer, the location detecting unit 50 determines whether the temperature is 25° C. or lower. Using the pedometer, the operation detecting unit 52 determines whether the user has walked 5000 steps or more. Using the service area detecting function, the location detecting unit 50 determines whether the location is in an out-of-service area. Using the keys, the operation detecting unit 52 determines whether the keys have been sequentially pressed from 1 to 9. Using the pulse checker, the operation detecting unit 52 determines whether the pulse rate has reached 100 times/min or higher. Using the acceleration sensor, the operation detecting unit 52 determines whether the user has crouched down. Using the camera, the operation detecting unit 52 determines whether a photo has been taken.

Also, in a case where the location detecting unit 50 or the operation detecting unit 52 is to detect "facing north, releasing the lock, performing an exercise equivalent to 100 kcal or more, tapping the center of the screen twice in the shade of a building, throwing the mobile phone upward and catching the mobile phone, and then making a phone call" as a specific operation performed at a specific location, the following operations are performed. Using the geomagnetic sensor, the location detecting unit 50 determines whether the mobile phone faces north. Using the fingerprint sensor, the operation detecting unit 52 determines whether the lock has been released. Using the acceleration sensor and the activity monitor, the operation detecting unit 52 determines whether an exercise equivalent to 100 kcal has been performed. Using the GPS receiver and the optical sensor, the location detecting unit 50 determines whether the location is in the shade of a building. Using the touch panel, the operation detecting unit 52 determines whether the center of the screen has been tapped twice. Using the acceleration sensor, the operation detecting unit 52 determines whether the user has thrown the mobile phone upward and caught it. Using the telephone function, the operation detecting unit 52 determines whether a phone call has been made.

As in Table 3, the location detecting unit 50 can detect a specific location, based on information from sensors and the like. The operation detecting unit 52 can detect a specific operation, based on information from sensors and the like. Also, two or more specific locations can be combined. Two or more specific operations can also be combined.

In Embodiments 1 through 7, an addition of a point and an addition of an item to be used in the game have been described as examples of changes in the status of the mobile device. Examples of changes in the status of the mobile device also include displaying an image, outputting a musical tune, and downloading an image or a musical tune from a free site.

Mobile telephone terminals have been described as examples of the mobile device 100. However, the mobile device 100 may be a handheld gaming device or the like. In a case where the mobile device 100 is a mobile telephone terminal, information transmission and reception to and from the center 11 can be performed as in Embodiments 5 through 7.

Preferred embodiments of the present invention have been described in detail. The present invention is not limited to the specific embodiments but may be varied or changed within the scope of the claimed invention.

EXPLANATION OF REFERENCE NUMERALS

10 CPU
16 acceleration sensor 16
18 GPS
20 display unit
50 location detecting unit
52 operation detecting unit
54 operation instructing unit
56 determining unit
58 status changing unit
59 location display nit
100 mobile device
110 center

What is claimed is:

1. A mobile device comprising:
a processor configured to:
  detect a first location of the mobile device;
  determine whether the first location of the mobile device matches a specific location;
  instruct a user to perform a specific operation when the first location matches the specific location;
  detect an operation of the user after instructing the user to perform the specific operation;
  determine whether the detected operation of the user matches the specific operation;
  detect a second location of the mobile device when the detected operation matches the specific operation;
  determine whether the second location matches the specific location; and
  change a status of the mobile device when the second location of the mobile device matches the specific location.

2. The mobile device according to claim 1, wherein, the processor is further configured to:
  determine whether the detected operation matches the specific operation based on a time elapsed since an instruction to perform the specific operation until the determination of a match between the detected operation and the specific operation.

3. The mobile device according to claim 1, wherein the processor is further configured to detect an acceleration applied to the mobile device, to detect the operation of the user.

4. The mobile device according to claim 1, wherein the processor is further configured to display the first location of the mobile device and the specific location simultaneously on a display unit, based on the first location of the mobile device detected and the specific location.

5. The mobile device according to claim 1, the processor is further configured to transmit, to a center, information about the first location of the mobile device detected, and receive, from the center, contents of the specific operation the user is to be instructed to perform.

6. The mobile device according to claim 1, wherein the processor is further configured to:
   notify a center that the detected operation matches the specific operation and the second location of the mobile device matches the specific location, when the detected operation matches the specific operation and the second location of the mobile device matches the specific location; and
   change the status of the mobile device, based on an instruction from the center.

7. A method comprising:
   detecting a first location of a mobile device;
   determining whether the first location of the mobile device matches a specific location;
   instructing a user to perform a specific operation when the first location of the mobile device matches the specific location;
   detecting an operation of the user after instructing the user to perform the specific operation;
   determining whether the detected operation of the user matches the specific operation;
   detecting a second location of the mobile device when the detected operation matches the specific operation;
   determining whether the second location of the mobile device matches the specific location; and
   changing a status of the mobile device, when the second location of the mobile device matches the specific location.

8. A non-transitory computer readable storage medium storing a program causing a computer to execute a process for communications, the process comprising:
   detecting a first location of a mobile device;
   determining whether the first location of the mobile device matches a specific location;
   instructing a user to perform a specific operation when the first location of the mobile device matches the specific location;
   detecting an operation of the user after instructing the user to perform the instructed operation;
   determining whether the detected operation of the user matches the specific operation;
   detecting a second location of the mobile device when the detected operation matches the specific operation;
   determining whether the second location of the mobile device matches the specific location; and
   changing a status of the mobile device, when the second location of the mobile device matches the specific location.

9. The mobile device according to claim 1, wherein the specific operation is at least one of standing, sitting, standing up, sitting down, jumping, lifting the mobile device up or down, throwing the mobile device, catching the mobile device, and moving the mobile device from left to right.

* * * * *